United States Patent
Feng et al.

(10) Patent No.: US 10,706,666 B2
(45) Date of Patent: Jul. 7, 2020

(54) DISPLAY ASSEMBLY FOR RELEVANT MESSAGING FOR GAMING APPARATUS AND METHODS THEREFOR

(71) Applicant: Empire Technological Group Limited, Las Vegas, NV (US)

(72) Inventors: Linyi Frank Feng, Las Vegas, NV (US); Daryn Kiely, Las Vegas, NV (US)

(73) Assignee: Empire Technological Group Limited, Las Vegas, NV (US)

( * ) Notice: Subject to any disclaimer, the term of this patent is extended or adjusted under 35 U.S.C. 154(b) by 75 days.

(21) Appl. No.: 15/688,841

(22) Filed: Aug. 28, 2017

(65) Prior Publication Data

US 2018/0190064 A1 Jul. 5, 2018

Related U.S. Application Data

(60) Provisional application No. 62/483,927, filed on Apr. 10, 2017, provisional application No. 62/441,104, filed on Dec. 30, 2016.

(51) Int. Cl.
*G07F 17/32* (2006.01)
*A63F 13/87* (2014.01)

(52) U.S. Cl.
CPC ............ *G07F 17/322* (2013.01); *A63F 13/87* (2014.09); *G07F 17/3211* (2013.01); *G07F 17/3225* (2013.01); *G07F 17/3244* (2013.01)

(58) Field of Classification Search
None
See application file for complete search history.

(56) References Cited

U.S. PATENT DOCUMENTS

| | | | |
|---|---|---|---|
| 4,814,589 A | 3/1989 | Storch | |
| 5,510,081 A | 4/1996 | Edwards et al. | |
| 5,735,742 A | 4/1998 | French | |
| D424,068 S | 5/2000 | Takemasa | |
| 6,425,817 B1 | 7/2002 | Momemy | |
| 6,464,584 B2 | 10/2002 | Oliver | |
| 6,530,836 B2 | 3/2003 | Soltys et al. | |

(Continued)

FOREIGN PATENT DOCUMENTS

WO WO 2017/203142 A1 11/2017

OTHER PUBLICATIONS

Notice of Allowance for U.S. Appl. No. 29/600,225, dated May 15, 2018.

(Continued)

*Primary Examiner* — Damon J Pierce

(57) ABSTRACT

Embodiments disclosed herein concern messaging for gaming apparatus. Gaming apparatus that are operated by dealers can also be controlled, managed, monitored or enhanced by an electronic control system. Through such electronic control, gaming apparatus can be providing with relevant information for presentation at or proximate to the gaming apparatus. The electronic control system can present the relevant information on a display device as messages or notifications to dealers, managers and/or players. The electronic control system can also provide or facilitate monitoring of dealer status or actions and/or gaming apparatus status or events, such that the relevant information be presented can signal such status or actions.

12 Claims, 21 Drawing Sheets

(56) References Cited

U.S. PATENT DOCUMENTS

| | | |
|---|---|---|
| 7,018,291 B1 | 3/2006 | Lemke et al. |
| 7,025,189 B1 | 4/2006 | Petrusan |
| 7,201,660 B2 | 4/2007 | Kiely |
| 7,351,145 B1 | 4/2008 | Ornstein et al. |
| 7,559,839 B2 | 7/2009 | Bahar |
| D628,199 S | 11/2010 | Yukikado |
| D628,913 S | 12/2010 | Cheng |
| D641,018 S | 7/2011 | Lee |
| D647,574 S | 10/2011 | Zhang |
| 8,157,643 B1 | 4/2012 | Phan |
| D669,076 S | 10/2012 | Haller |
| 8,282,480 B2 | 10/2012 | Wells |
| 8,430,733 B2 | 4/2013 | Chang et al. |
| 8,591,306 B1 | 11/2013 | Kearns |
| D698,353 S | 1/2014 | Choi |
| 8,814,681 B2 | 8/2014 | Wells et al. |
| 8,814,706 B2 | 8/2014 | Wells et al. |
| 8,968,086 B2 | 3/2015 | Wells et al. |
| D726,295 S | 4/2015 | Kim |
| 9,147,318 B2 | 9/2015 | Tarantino |
| 9,292,996 B2 | 3/2016 | Davis et al. |
| D761,901 S | 7/2016 | Kim |
| 9,489,799 B2 | 11/2016 | Saffari et al. |
| D778,279 S | 2/2017 | Pendise |
| 9,754,455 B2 | 9/2017 | Tarantino |
| D811,488 S | 2/2018 | To et al. |
| 9,940,779 B2 | 4/2018 | To et al. |
| D824,906 S | 8/2018 | Feng et al. |
| D826,228 S | 8/2018 | Feng et al. |
| 2002/0120572 A1 | 8/2002 | Bellucci |
| 2003/0058372 A1 | 3/2003 | Williams |
| 2003/0089010 A1 | 5/2003 | Wechter |
| 2004/0033095 A1 | 2/2004 | Saffari |
| 2005/0026680 A1 | 2/2005 | Gururajan |
| 2006/0205498 A1* | 9/2006 | Kogo ............... A63F 13/08 463/30 |
| 2008/0139274 A1* | 6/2008 | Baerlocher ........ G07F 17/32 463/16 |
| 2008/0261699 A1 | 10/2008 | Topham |
| 2009/0075725 A1 | 3/2009 | Koyama |
| 2009/0082079 A1 | 3/2009 | Kuhn |
| 2009/0098932 A1 | 4/2009 | Longway |
| 2009/0253478 A1 | 10/2009 | Walker |
| 2010/0178989 A1 | 7/2010 | Kuhn |
| 2010/0291675 A1 | 11/2010 | Pease |
| 2011/0050602 A1 | 3/2011 | Jeong et al. |
| 2011/0195786 A1 | 8/2011 | Wells |
| 2011/0195792 A1 | 8/2011 | Wells |
| 2014/0370989 A1 | 12/2014 | Acres |
| 2015/0014925 A1 | 1/2015 | Miller |
| 2015/0375096 A1 | 12/2015 | Jackson |
| 2016/0071367 A1 | 3/2016 | Litman |
| 2016/0093135 A1 | 3/2016 | Bond |
| 2016/0328913 A1 | 11/2016 | Blazevic |
| 2017/0330136 A1 | 11/2017 | Bratter |
| 2018/0005486 A1 | 1/2018 | Risnoveanu |
| 2018/0068517 A1 | 3/2018 | Drennan |
| 2018/0189921 A1 | 7/2018 | Feng |
| 2018/0190063 A1 | 7/2018 | Feng |
| 2018/0190064 A1 | 7/2018 | Feng |
| 2019/0164381 A1 | 5/2019 | Feng |

OTHER PUBLICATIONS

Notice of Allowance for U.S. Appl. No. 29/615,741, dated May 22, 2018.
Office Action for U.S. Appl. No. 15/396,308, dated Sep. 21, 2018.
Final Office Action for U.S. Appl. No. 15/396,308, dated Feb. 27, 2019.
Office Action for U.S. Appl. No. 15/396,342, dated Apr. 12, 2019.
Restriction Requirement for U.S. Appl. No. 15/688,841, dated Mar. 4, 2019.
Office Action for U.S. Appl. No. 15/826,680, dated May 16, 2019.
Karami et al., "Image Matching Using SIFT, SURF, BRIEF and ORB: Performance Comparison for Distorted Images", In Proceedings of the 2015 Newfoundland Electrical and Computer Engineering Conference, St. johns, Canada, Nov. 2015.

* cited by examiner

DISPLAY ASSEMBLY FOR RELEVANT MESSAGING FOR GAMING APPARATUS AND METHODS THEREFOR

CROSS REFERENCE TO RELATED APPLICATION

This application claims priority to U.S. Patent Provisional Application No. 62/483,927, filed Apr. 10, 2017, and entitled "DISPLAY ASSEMBLY FOR RELEVANT MESSAGING FOR GAMING APPARATUS AND METHODS THEREFOR," which is incorporated herein for all purposes.

This application also claims priority to U.S. Patent Provisional Application No. 62/441,104, filed Dec. 30, 2016, and entitled "DEALER AND GAMING APPARATUS CONTROL SYSTEM FOR GAMING ESTABLISHMENTS," which is incorporated herein for all purposes.

BACKGROUND OF THE INVENTION

Today, gaming establishments, such as casinos, operate gaming apparatus, such as gaming tables that provide casino table games. Casino table games, such as Poker, Roulette, Black Jack, Craps, Baccarat, etc., often involve players sitting at a physical table using physical game objects (cards, dice, chips, etc.) to play the games.

To support such gaming tables, gaming establishments need to provide various support personnel as well as gaming supplies to gaming tables. For example, a gaming establishment might employ a full supporting staff of dealers, pit bosses, shift managers, cashier clerks, chip runners, waiters, service technicians, etc. to support its gaming tables. Gaming supplies often need replenished at gaming tables and various support personnel are enlisted to carry out replenishment.

In wagering-based games of chance, many players are superstitious. For example, many players that play Baccarat keep careful track of the shoe history, either on paper or with screens that show every hand since the shoe began. Companies that market display screens present the shoe history in various different ways, trying to define patterns. However, the way the shoe history is displayed may be confusing, the display may be difficult to read, players may not be able to read the screens because it is too small, or for various other reasons, players are not able to view the screen to keep track of the shoe history. Thus, the gaming establishment may lose players due to inability to view a display screen.

Additionally, some superstitions are based on having a specific dealer deal the cards. Some players only want to play with a certain dealer believing that the dealer brings them luck. However, it is difficult, based on the display itself, to determine when a dealer is to leave and/or return to deal. Accordingly, there is a need for improved approaches to display game status to players, schedule, monitor and manage dealers and/or gaming apparatus within a gaming establishment.

SUMMARY

Embodiments disclosed herein concern messaging for gaming apparatus. Gaming apparatus that are operated by dealers can also be controlled, managed, monitored or enhanced by an electronic control system. Through such electronic control, gaming apparatus can be providing with relevant information for presentation at or proximate to the gaming apparatus. The electronic control system can present the relevant information on a display device as messages or notifications to dealers, managers and/or players. The electronic control system can also provide or facilitate monitoring of dealer status or actions and/or gaming apparatus status or events, such that the relevant information be presented can signal such status or actions.

The invention can be implemented in numerous ways, including as a method, system, device, apparatus (including computer readable medium and graphical user interface). Several embodiments of the invention are discussed below.

As a display assembly, one embodiment can, for example, include at least: a first display panel; an inner border region around an outer periphery of the first display panel; an outer cover structure positioned around at least a portion of an outer periphery of the inner border region, the outer cover structure having a central hollow region; and a plurality of light segments positioned within at least a portion of the central hollow region, the light segments arranged adjacent one another. The plurality of light segments can be configured to communicate with a controller to be individually controlled to be illuminated.

As a method for displaying status information associated with play of a game of chance on a gaming table for use in a gaming establishment, one embodiment can, for example, include at least: positioning a plurality of light segments around at least a portion of an outer periphery of a display device, the display device configured to display game outcomes for one or more wager-based games played at the gaming table; monitoring, via a controller, game outcome for the one or more wager-based games played at the gaming table; determining, at the controller, illumination data based on the game outcome; transmitting an illumination signal to at least one of the light segments based on the illumination data; and illuminating the at least one light segments based on the illumination signal to present a light pattern.

As a method for displaying status information associated with an electronic gaming table for use in a gaming establishment, one embodiment can, for example, include at least: monitoring game state for one or more wager-based games performed at the electronic gaming table; determining illumination data for an edge status illumination device associated with and provided proximate to the electronic gaming table, the illumination data being based at least in part on the monitored game state; and controlling the edge status illumination device in accordance with the illumination data.

As a method for displaying status information associated with a gaming table for use in a gaming establishment, one embodiment can, for example, include at least: permitting play of one or more wager-based games at the gaming table; identifying a status of a dealer operating the gaming table to provide the one or more wager-based games performed at the electronic gaming table; determining illumination data for at least one edge status illumination device positioned around at least a portion of an outer periphery of a display device associated with the gaming table, the illumination data being based at least in part on the status of the dealer; transmitting the illumination data to the at least one edge status illumination device; and controlling illumination of the at least one edge status illumination device in accordance with the illumination data, thereby presenting status information for the dealer operating the gaming table.

As a method for displaying status information associated with an electronic gaming table for use in a gaming establishment, one embodiment can, for example, include at least: permitting performance of one or more wager-based games at the electronic gaming table; identifying dealer status of a dealer operating the electronic gaming table to provide the one or more wager-based games performed at the electronic gaming table; determining illumination data for an edge status illumination device associated with the electronic gaming table, the illumination data being based at least in part on the identified dealer status; and controlling the edge status illumination device in accordance with the illumination data.

As an electronic gaming system, one embodiment can, for example, include at least: an electronic gaming table having a table controller, a dealer terminal and a gaming appliance; a table display device configured to operatively connect to the table controller and be controlled to present gaming related information pertaining to wager-based table games at the electronic gaming table; and an edge display configured to operatively connect to the table controller and be controlled to present gaming related messages.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like elements, and in which.

DETAILED DESCRIPTION OF CERTAIN EMBODIMENTS

Embodiments disclosed herein concern messaging for gaming apparatus. Gaming apparatus that are operated by dealers can also be controlled, managed, monitored or enhanced by an electronic control system. Through such electronic control, gaming apparatus can be providing with relevant information for presentation at or proximate to the gaming apparatus. The electronic control system can present the relevant information on a display device as messages or notifications to dealers, managers and/or players. The electronic control system can also provide or facilitate monitoring of dealer status or actions and/or gaming apparatus status or events, such that the relevant information be presented can signal such status or actions.

According to one embodiment, the display device presenting the relevant information can be a display device that includes light segments that can be individually controlled to provide a color, pattern, shape, etc. The light segments are typically of higher intensity that offered by a convention computer display (e.g., LCD display) and thus offer the advantage of being visible from a greater distance. In one embodiment, the light segments can be provided on or around at least a portion of a LCD display that is provided for display of other information. In another embodiment, the light segments can be provided on or around (e.g., at border or edge) at least a portion of a back-to-back pair of LCD displays that are use to similarly display of other information.

Embodiments of various aspects of the invention are discussed below with reference to FIGS. 1-16. However, those skilled in the art will readily appreciate that the detailed description given herein with respect to these figures is for explanatory purposes as the invention extends beyond these limited embodiments.

Figure 1:
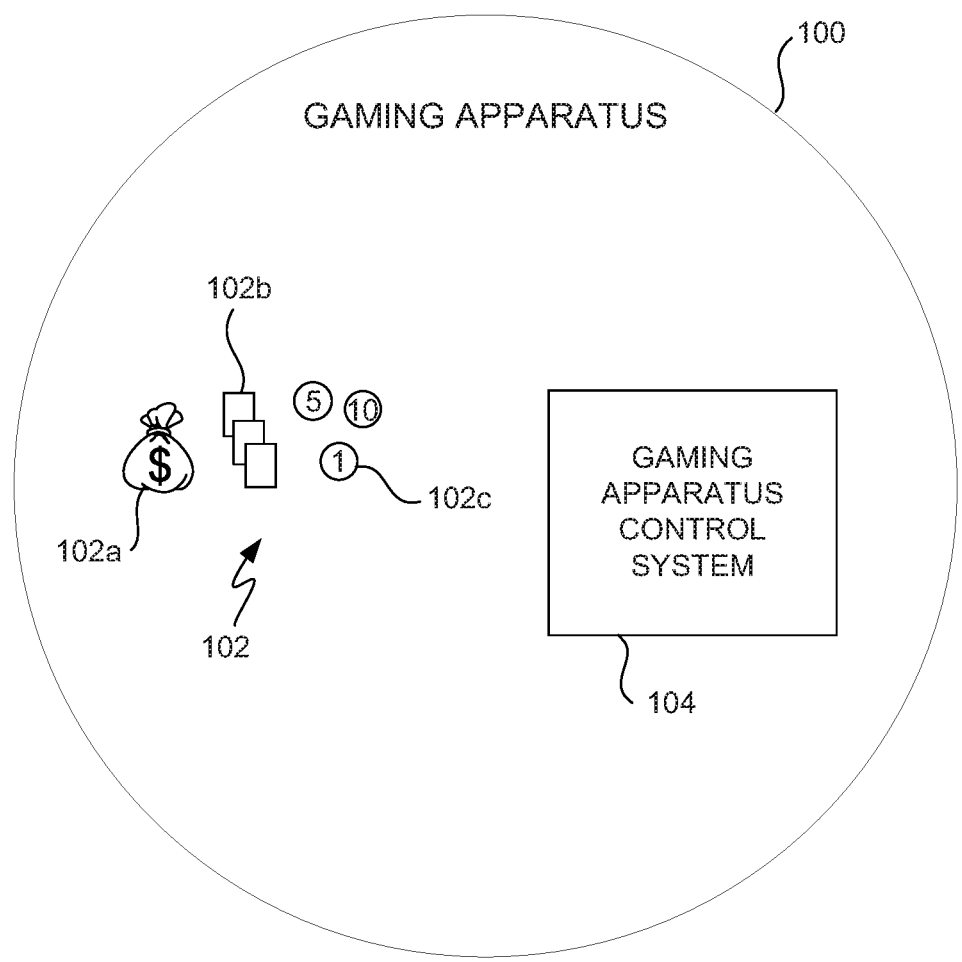
FIG. 1 is a diagram of a gaming apparatus according to one embodiment.

FIG. 1 is a diagram of a gaming apparatus 100 according to one embodiment. The gaming apparatus 100 can pertain to a game of chance, such as a wager-based game or a skill-based game, or some combination thereof. Examples of gaming apparatus include gaming tables and slot machines. The gaming apparatus 100 can generally include gaming supplies 102 and a gaming apparatus control system 104. The gaming supplies 102 can include various gaming supplies that might be available for use at the gaming apparatus 100 to support a game of chance. For example, the gaming supplies 102 include cash 120a, cards 120b and/or chips 120c. The gaming apparatus control system 104 can provide electronic monitoring and/or management of the gaming apparatus 100 including use of gaming supplies 102, bets, wins, and also presenting (e.g., displaying) information to interested persons, such as player, dealers or managers, of gaming related information or dealer-related information. In doing so, the gaming apparatus control system 104 can include various electrical devices, such as a controller, displays, cameras, display interfaces, network interface(s), electronic support appliances (e.g., electronic shoe), etc.

According to one embodiment, the gaming apparatus control system 104 can provide multiple display devices to present information to interested persons. For example, the displays can include (i) an apparatus display screen that can present information pertain to gaming currently or previously undergone at the gaming apparatus 100, often near-term historical information, and (ii) a messaging display often provided adjacent or proximate to the apparatus display. In one implementation, the messaging display can present its message with light sources that offer substantially greater intensity that light provided by the apparatus display screen. Advantageously, the message conveyed by the messaging display is able to be seen and understood from a significant distance away (e.g., 20-120 feet), whereas the information presented by the apparatus display is designed for nearby persons (e.g., less than 15 feet).

Figure 2:
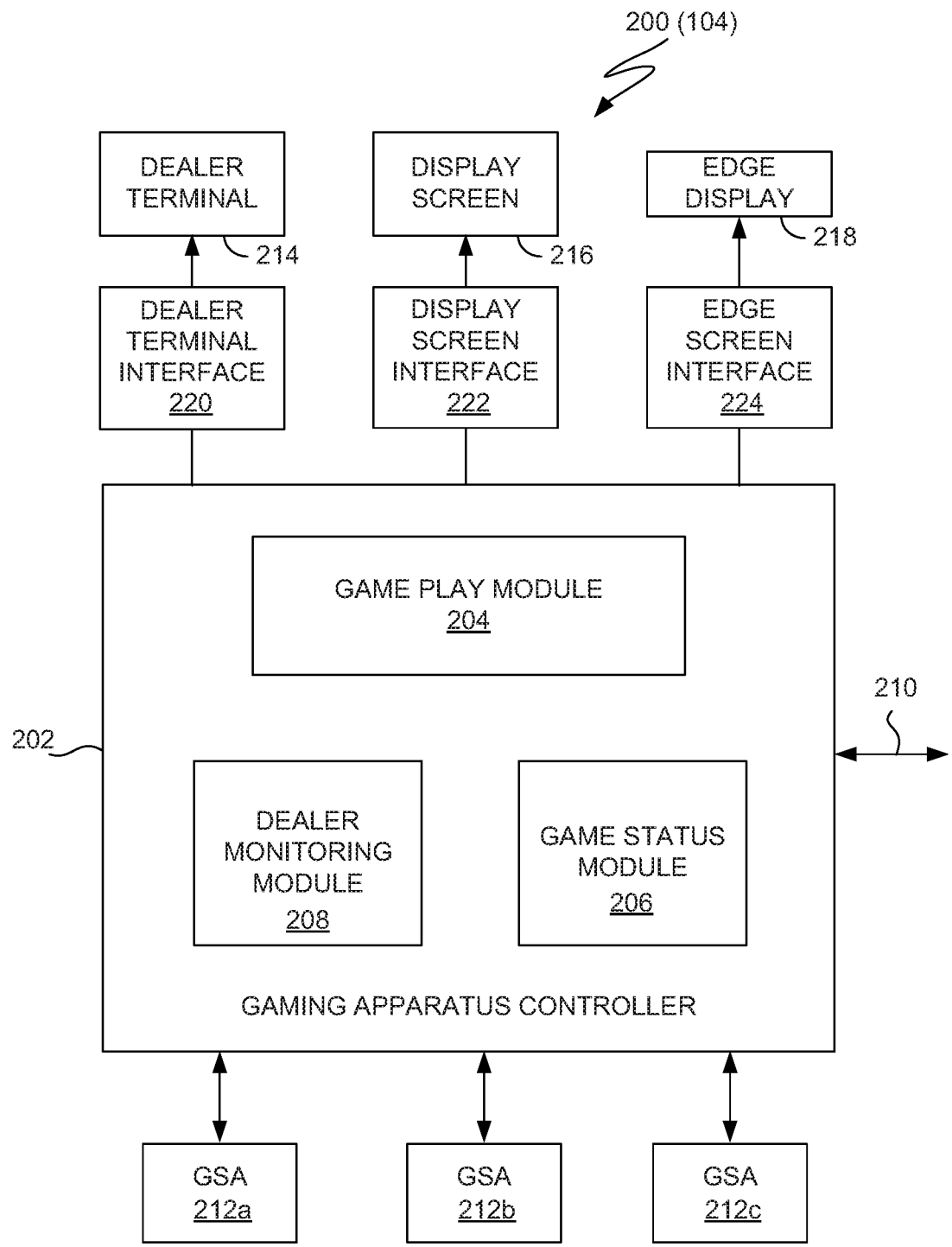
FIG. 2 is a block diagram of a gaming apparatus control system according to one embodiment.

FIG. 2 is a block diagram of a gaming apparatus control system 200 according to one embodiment. The gaming apparatus control system 200 is, for example, suitable for use as the gaming apparatus control system 104 illustrated in FIG. 1. Typically, the gaming apparatus control system 200 is associated with a gaming apparatus, such as the gaming apparatus 306 illustrated in FIG. 3. The gaming apparatus control system 200 includes a gaming apparatus controller 202 that controls overall operation at the gaming apparatus to which the gaming apparatus control system 200 is coupled. The gaming apparatus controller 202 can include various functional components, such as modules, that are used by the gaming apparatus control system 200 to perform various operations.

As illustrated in FIG. 2, the gaming apparatus controller 202 can include a game play module 204, a game status module 206 and a dealer monitoring module 208. The game play module 204 can, for example, serve to manage game play at the gaming apparatus associated with the gaming apparatus control system 200. The game status module 206 can monitor status of one or more wager-based games being performed at the gaming apparatus. For example, the game status module 206 could monitor gaming supplies, player stats, dealt cards, winners, winning streaks, and the like. The dealer monitoring module 208 can, for example, monitor dealer status. Typically, the gaming apparatus supports the play of one or more wager-based games that are operated by a dealer resident at the gaming apparatus. Hence, the dealer monitoring module 208 can serve to monitor the status of the dealer, such as dealer performance, dealer breaks, dealer requests, dealer shift changes, and the like. The gaming apparatus controller 202 can also be coupled to a central gaming server via a network link 210. The network link 210 can represent one or more networks and/or one or more network links, whether wired or wireless.

The gaming apparatus controller 202 can also be assisted by one or more gaming support appliances 212. The gaming support appliances 212 can couple to the gaming apparatus controller by either wired or wireless means. Examples of gaining support appliances, include an electronic shoe, an electronic lock, an electronic chip tray, etc. as shown in FIG. 2, the gaming apparatus control system 200 includes gaming support appliance 212a, gaming support appliance 212b and the gaming support appliance 212c.

The gaming apparatus control system 200 is typically designed to convey information to a dealer, managers, or players (including potential player, i.e., bystanders). To do so, the gaming apparatus control system 200 can support one or more display devices. In the embodiment illustrated in FIG. 2, the gaming apparatus control system 200 supports a dealer terminal 214, a display screen 216, and an edge display 218. These display devices can be individually controlled to provide pertinent information to the dealer, managers, or players. For example, the dealer terminal 214 can display information suitable or useful for the dealer operating the gaming apparatus. The display screen 216 can display information suitable or useful for the players that are playing wager-based games at the gaming apparatus. For example, the display screen 216 can display wins, winning streaks, bets, and various other gaming related data. The edge display 218 can display information suitable for anyone in the vicinity of the gaming apparatus, which can include the dealer, players and managers.

In order to control the display devices, the gaming apparatus control system 200 can further include a dealer terminal interface 220, a display screen interface 222 and an edge display interface 224. The dealer terminal interface 220 provides an interface to the dealer terminal 214. The display screen interface 222 provides an interface to the display screen 216. The edge display interface 224 provides an interface to the edge display 218. These interfaces can facilitate control over what information is presented on the various display devices. The interfaces can, for example, include controllers, drivers, memory, and the like. Although the various interfaces and display screens are shown separately, in other embodiments it is possible that one or more of these interfaces and/or displays can be integrated together, shared or provided adjacent one another.

Figure 3:
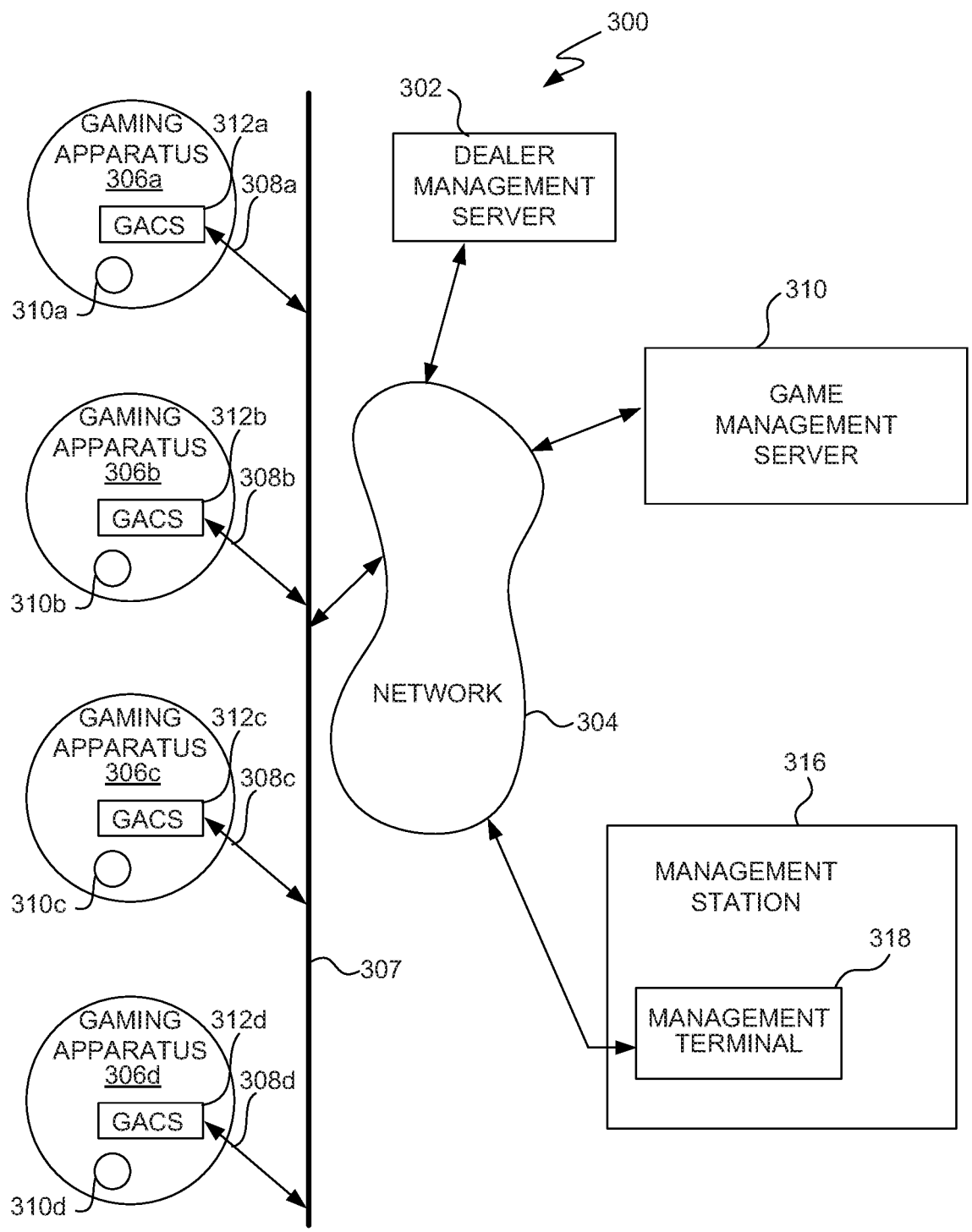
FIG. 3 is a block diagram of an electronic management system according to one embodiment.

FIG. 3 is a block diagram of an electronic management system 300 according to one embodiment. The electronic management system 300 serves to provide dealer and gaming apparatus control within a gaming environment.

The electronic management system 300 includes a dealer management server 302 that provides backend processing for the electronic management system 300. The dealer management server 302 is coupled to at least one network 304. The network 304 can be a global network, a local area network, and/or any combination of wired and/or wireless networks. The electronic management system 300 supports a plurality of gaming apparatus 306. In the embodiment illustrated in FIG. 3, the electronic management system 300 supports gaming apparatus 306a, gaming apparatus 306b, gaming apparatus 306c, and gaming apparatus 306d. The gaming apparatus 306a-306d can pertain to a game of chance, such as a wager-based game or a skill-based game, or some combination thereof. Examples of gaming apparatus include gaming tables and slot machines. The gaming apparatus 306a can couple to the network 304 by way of a main network link 307 and an apparatus network link 308a. Similarly, the gaming apparatus 306b can couple to the network 304 by way of the main network link 307 and an apparatus network link 308b; the gaming apparatus 306c can couple to the network 304 by way of the main network link 307 and an apparatus network link 308c; and the gaming apparatus 306d can couple to the network 304 by way of the main network link 307 and an apparatus network link 308d.

The gaming apparatus 306 can also include or make used of (e.g., couple to) a gaming support appliance. The gaming support appliance is an electronic device that is coupled or proximate to the gaming apparatus 306a, 306b, 306c or 306d. The gaming support appliance can include an electronic monitor and an electronic lock. The electronic monitor can provide electronic monitoring of an aspect of the gaming apparatus 306. For example, the gaming support appliance having the at least one electronic monitor can pertain to a card shoe, a chip rack, or a money drawer, which can be monitored by the at least one electronic monitor thereof. In such examples, the gaming supplies associated with the gaming apparatus 306a being made available and monitored by the gaming support appliance would, for example, be the cards, chips and money, respectively. The electronic lock can provide an ability to electronically lock or unlock the associated gaming support appliance.

The electronic management system 300 can further include a game management server 310. The game management server 510 can control or monitor game play at the gaming apparatus 306a, 306b, 306c and 306d. The management server 310 can interact with the gaming apparatus 306a, 306b, 306c and 306d via the network 304 for game play, game management, game regulation log, etc.

Furthermore, the electronic management system 300 can include a management station 316. The management station 316 provides information and tools to facilitate management of personnel or gaming apparatus. The management station 316 can include a management terminal 318. The management terminal 318 can be operatively connected to the network 304. The management terminal 318 can be used by personnel at the management station 316. The management terminal 318 can, for example, include or couple to a display device to present information for use by the personnel (e.g., management personnel). For example, the management terminal 318 can present information concerning a pending break or a shift change of dealers a particular gaming apparatus. The information displayed can thus inform the management personnel that the particular gaming apparatus, or its dealer, is in need of a break or shift change.

The management station 318 might also store or manage inventory for gaming supplies, and might receive and process an incoming re-supply request from a particular gaming apparatus. The information displayed can thus inform personnel that the particular gaming apparatus, or its dealer, is in need of re-supply of particular gaming supplies.

The electronic management system 300 can also be implemented together with a logistic management system, such as detailed in U.S. patent application Ser. No. 15/396,308, filed Dec. 30, 2016, and entitled "LOGISTIC MANAGEMENT OF GAMING SUPPLIES FOR GAMING ESTABLISHMENTS," which is hereby incorporated by reference. A logistics management system can provide active supply status data pertaining to the plurality of gaming apparatus 306. In this regard, the gaming apparatus 306 can make use of the gaming support appliance having the at least one electronic monitor to acquire the data pertaining to the status of supplies at the associated gaming apparatus 306. Such supply status data pertaining to the gaming apparatus 306 can be transmitted to the dealer management server 302 or a logistics management server for storage in a transaction database or some other storage device. The supply status data can be provided to the dealer management server 302 or the logistic management server by the gaming apparatus 306 (or its gaming support appliance) in real-time or near real-time. For example, the supply status data could be provided whenever a change has been identified, on a periodic basis, or when manually or automatically triggered, or some combination thereof. A logistics management system can also interact with a supply repository to track quantities of gaming supplies resident within the supply depository. The gaming supplies can include cash, cards and chips. The quantities of the gaming supplies at the supply depository can be monitored or recorded in any of a variety of different ways, including manual counting and data entry into a management terminal, or through use of electronic sensors using an electronic appliance, or some combination thereof.

Figure 4:
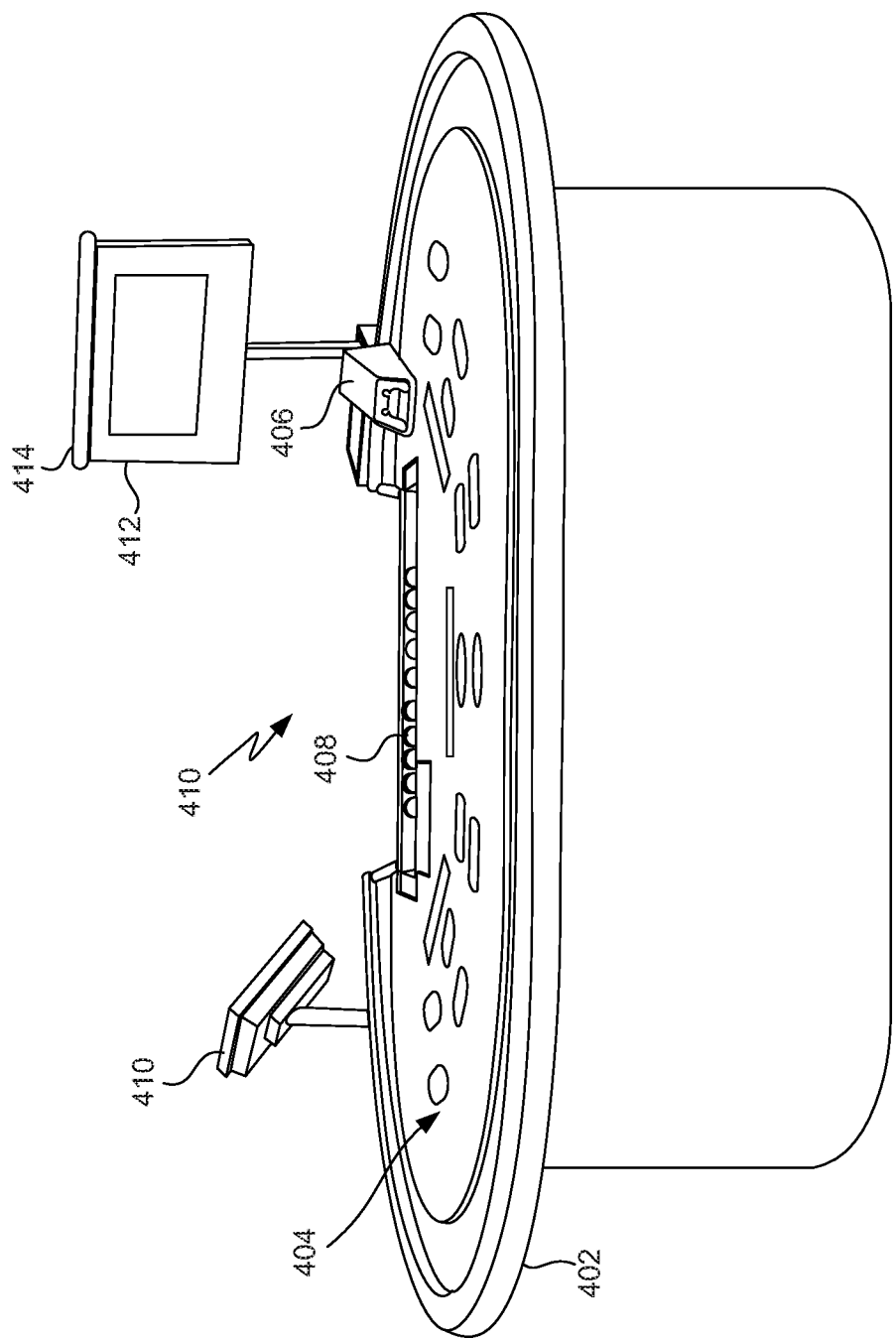
FIG. 4 is a perspective view of a gaming apparatus according to one embodiment.

FIG. 4 is a perspective view of a gaming apparatus 400 according to one embodiment. The gaming apparatus 400 is a gaming table. The gaming table having a player table surface 402 that supports seven (7) player positions 404. The gaming apparatus 400 includes an electronic card shoe 406, a chip tray 408, a dealer terminal 410, a table display 412, and an edge display 414. The gaming apparatus 400 can also include a gaming apparatus controller, such as the gaming apparatus controller 202. The gaming apparatus 400 can be referred to as an electronic gaming table since it makes use of various electronic devices.

Figure 5:
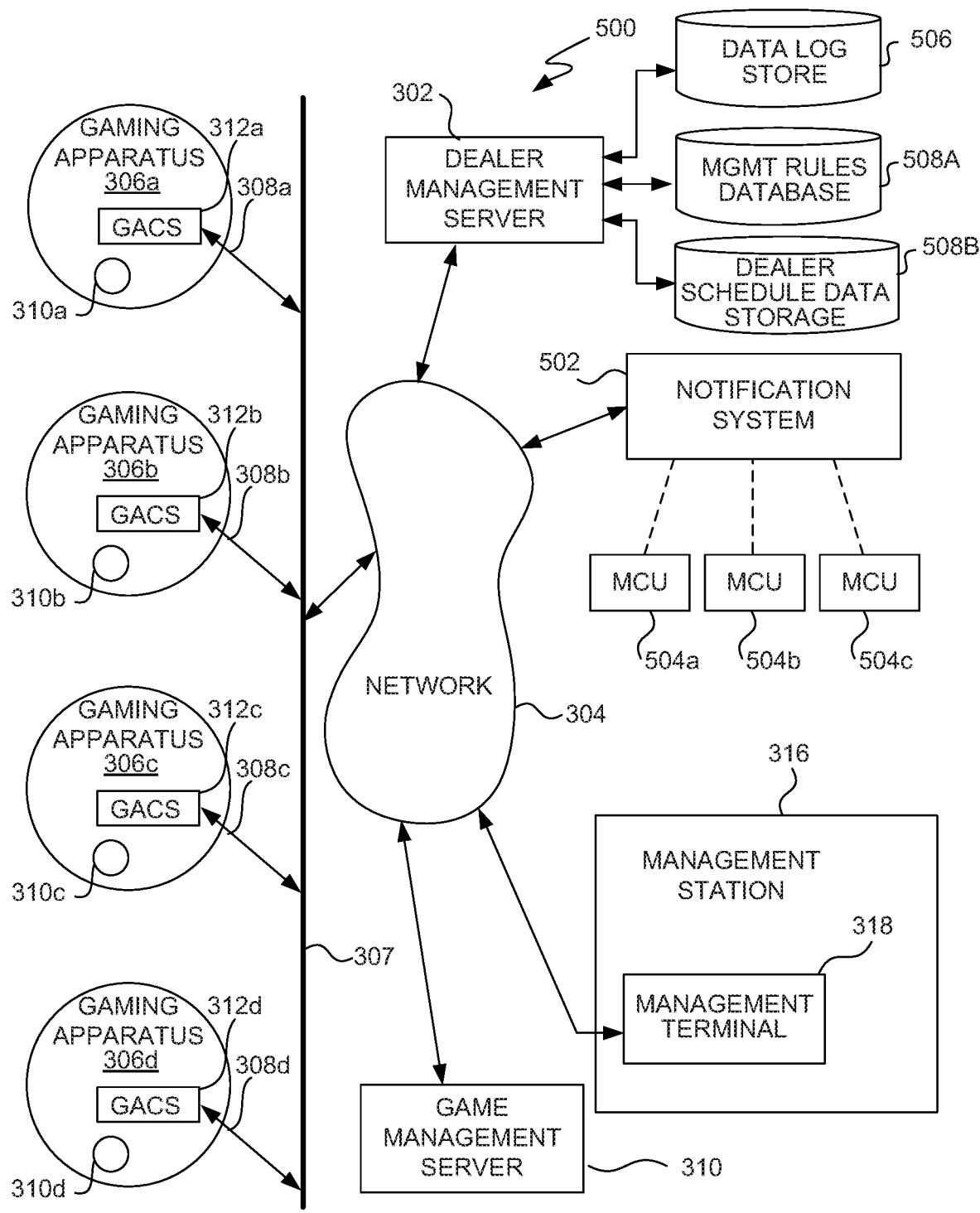
FIG. 5 is a block diagram of an electronic management system according to one embodiment.

FIG. 5 is a block diagram of an electronic management system 500 according to one embodiment. The electronic management system 500 serves to provide dealer and gaming apparatus control within a gaming environment. The electronic management system 500 is similar to the electronic management system 300 shown in FIG. 3. However, the electronic management system 500 can further include a notification system 502. The notification system 502 can be utilized to provide notifications to any persons interacting with the electronic management system 500. The notification system 502 can provide notifications to various persons. For example, the notifications can be provide to dealers associated with gaming apparatus 306, personnel associated with the management station 116, and/or notifications to attendants (e.g., delivery attendants). For notifications to dealers, the notification system 502 can send notifications to a dealer terminal associated with the gaming apparatus 306 where the dealer is operating. For notifications to personnel, such as managers (e.g., pit bosses), the notification system 502 can send notifications to the management terminal 118 associated with the management station 116 where the personnel is assigned. With respect to notifications to attendants, the attendants are typically associated with mobile communication units 504, whereby the notification system 502 can send notifications to particular attendants. As illustrated in FIG. 5, the notification system 502 can provide notifications to any one or more of the mobile communications units 504a, 504b and 504c. As an example, the mobile communication units 504a, 504b and 504c are normally associated with different attendants, dealers, managers, or other personnel.

The electronic management system 500 can also include a management rules database 508A that can be coupled to the dealer management server 102. The management rules database 508A can provide storage for management rules for use by the dealer management server 102. In addition, the electronic management system 500 can also include a dealer schedule data storage 508B that provides storage for dealer schedule data. Still further, the electronic management system 500 can also include a log store 506 that can be used to store data descriptive of all events or transactions associated with the dealer and/or gaming apparatus for future review, audit, and the like.

Figure 6:
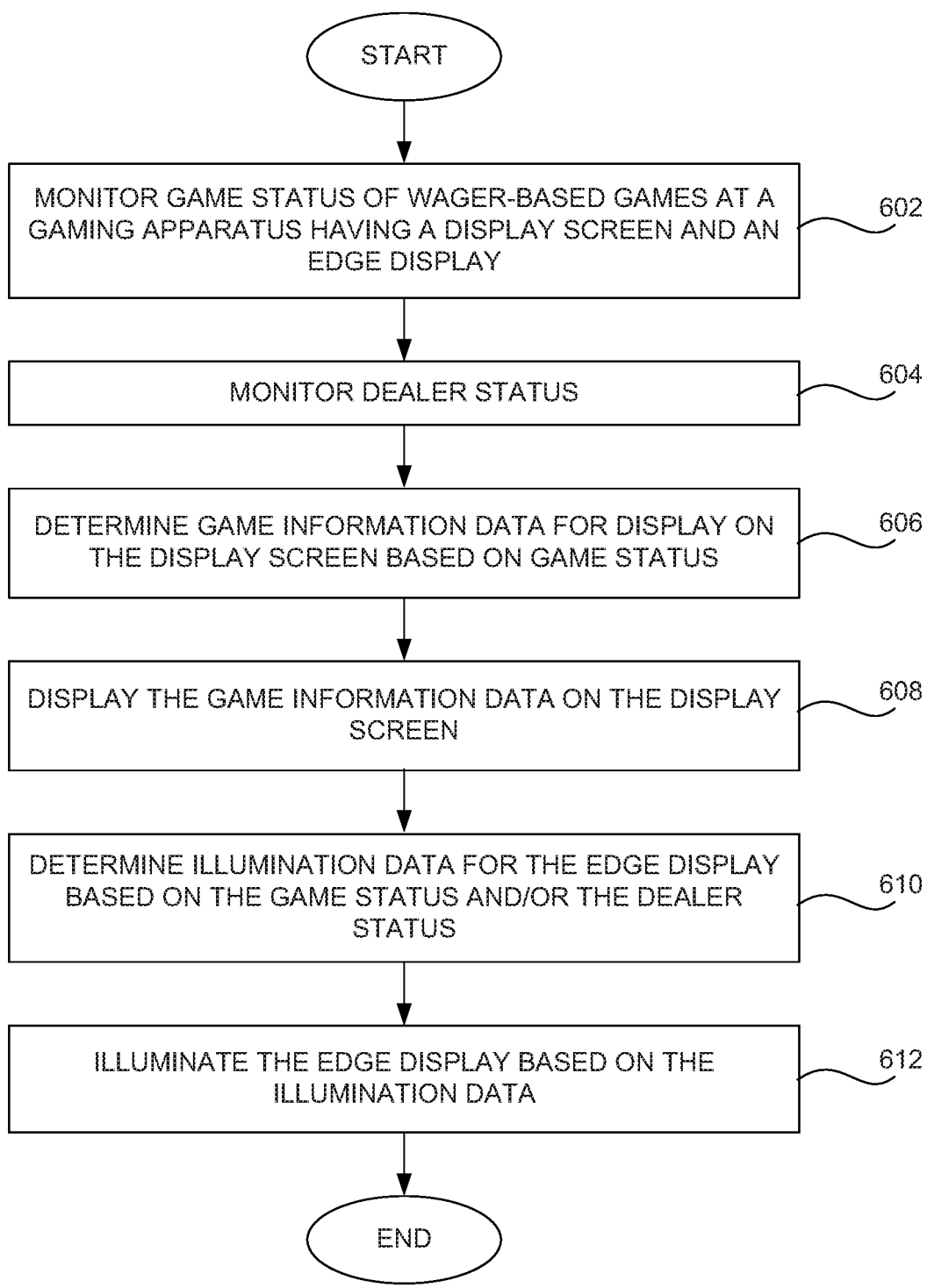
FIG. 6 is a flow diagram of a gaming display method according to one embodiment of the invention.

FIG. 6 is a flow diagram of a gaming display method 600 according to one embodiment of the invention. The gaming display method 600 can, for example, be performed by a gaming apparatus control system, a dealer management server, or a gaming management server, or some combination thereof. The gaming apparatus can have a display screen and an edge display. The gaming display method 600 can monitor 602 game status of one or more wager-based games operating at a gaming apparatus. For example, the game status module 206 of the gaming apparatus controller 202 illustrated in FIG. 2 can serve to monitor the game status.

The gaming display method 600 can also monitor 604 dealer status. For example, the dealer monitoring module 208 of the gaming apparatus controller 202 illustrated in FIG. 2 can serve to monitor 604 the dealer status.

Next, game information data can be determined 606 for display on the display screen based on gain status. The game information data can then be displayed 608 on the display screen associated with the gaming apparatus. In one embodiment, the display screen is a computer display screen, such as a LCD screen. The display screen can, for example, pertain to the display screen 216 illustrated in FIG. 2. Further still, the gaming display method 600 can determine illumination data for the edge display based on the game status and/or the dealer status. The edge display can, for example, pertain to the edge display 218 illustrated in FIG. 2. After the illumination data has been determined 610, the edge display can be illuminated 612 based on the illumination data. Following the illumination 612 of the edge display, the gaming display method 600 can end. However, the gaming display method 600 can repeat so that the monitoring and display of game information data in/or illumination data can be continuously or periodically performed.

Figure 7A:
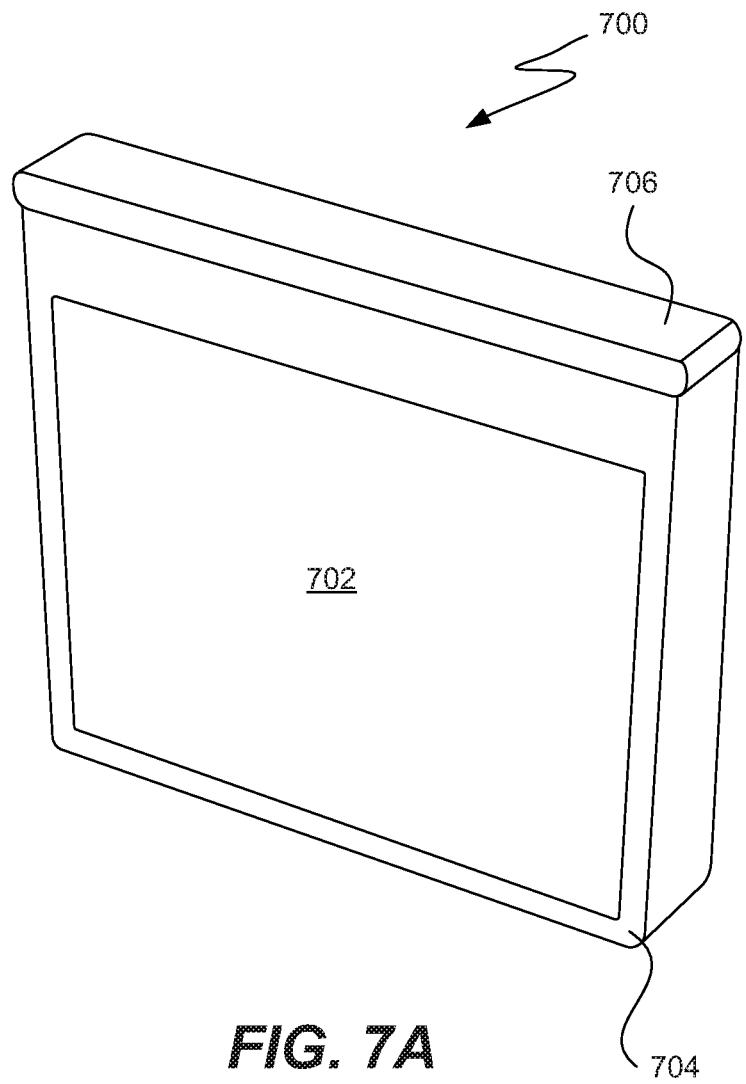
FIG. 7A illustrates a side prospective view of a display assembly according to one embodiment.
Figure 7B:
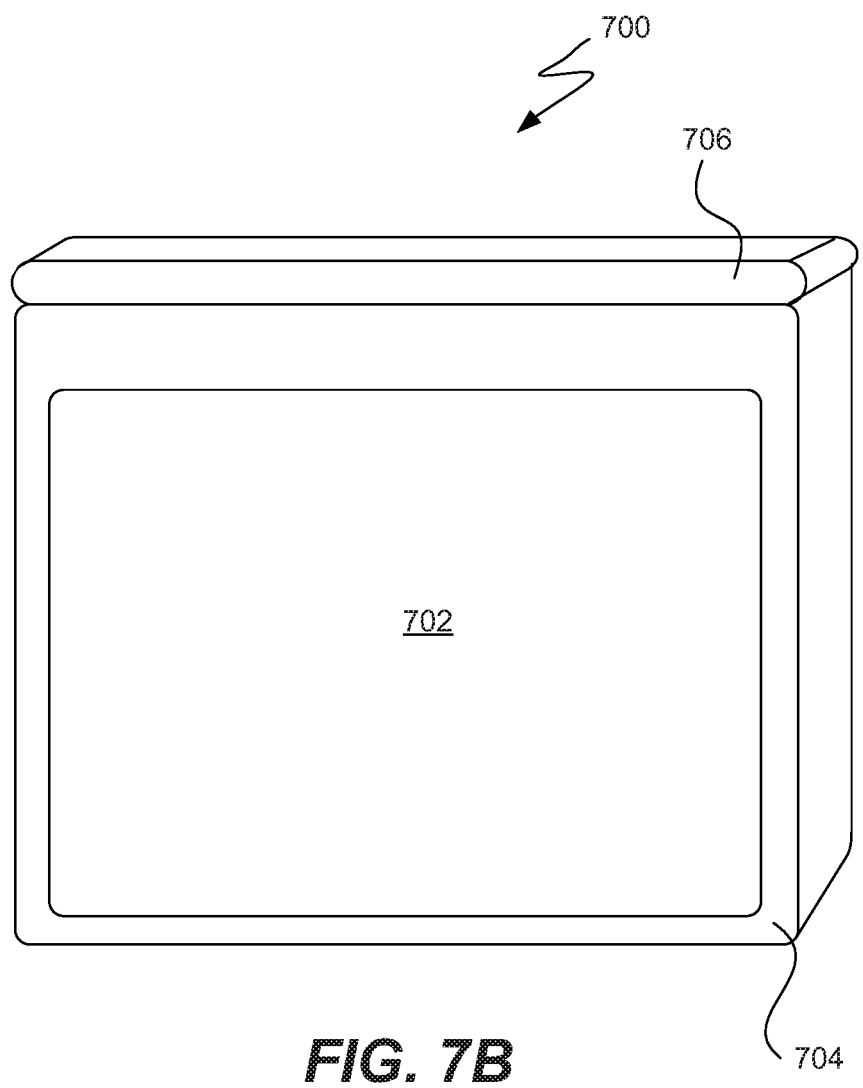
FIG. 7B illustrates a side prospective view of the display assembly according to the same embodiment.

FIG. 7A illustrates a side prospective view of a display assembly 700 according to one embodiment, and FIG. 7B illustrates a side prospective view of the display assembly 700 according to the same embodiment. The display assembly 700 includes a display panel 702 and an inner border region 704. The inner border region 704 can surround the outer periphery of the display panel 702. The display panel 702 can, in one implementation, pertain to a LCD panel. The display panel 702 represents a computer display screen that can present text and/or or graphics. The display assembly 700 further includes an outer cover structure 706 that can be positioned around at least a portion of an outer periphery of the inner border region 704. The outer cover structure 706 can include a plurality of light segments. Typically, the outer cover structure 706 has a central hollow region that can contain the plurality of light segments. The outer cover structure 706 is configured to allow light to at least partially pass through the structure. That is, when one or more of the light segments are individually controlled to be illuminated, the resulting light is able to at least partially pass through the outer cover structure 706, either through which material or by way of openings. As shown in FIG. 7A, the outer cover structure 706 is provided at a top portion (or edge) of the display assembly 700. It should be understood that in other embodiments, the outer cover structure 706 can be provided at the different portions of the display assembly 700, such as side portions and/or a bottom portion.

Although the outer cover structure 706 can be secured or abutted to the outer cover structure 704, the display assembly 700 can represent multiple independent displays. For example the display panel 702 can represent a display screen, such as computer monitor type display, and the outer cover structure 706 with its light segments therein can represent an edge display.

Figure 7C:
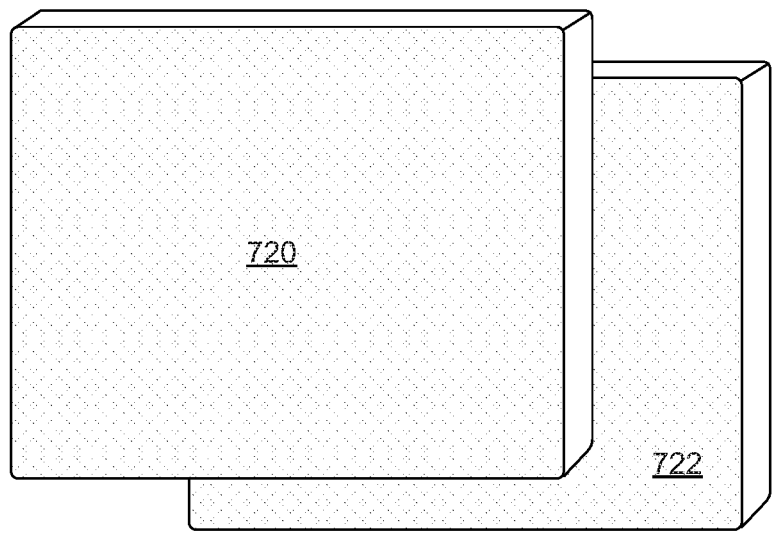
FIGS. 7C-7E illustrates front prospective views of an assembly of a display assembly according to one embodiment.
Figure 7D:
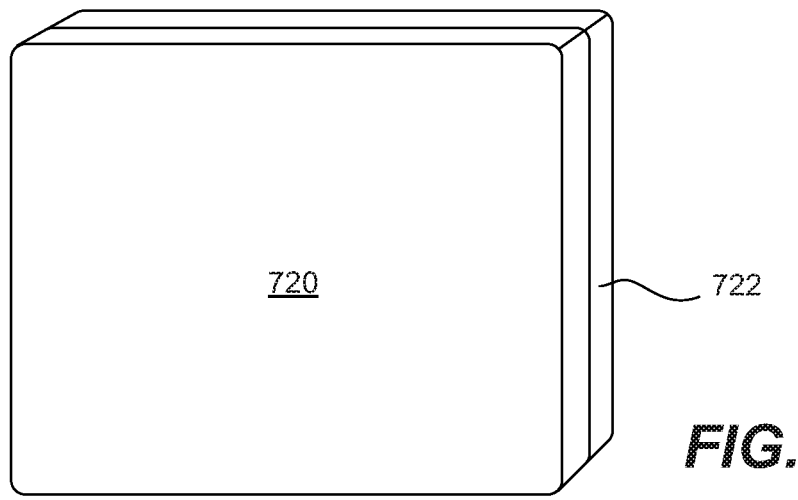
Figure 7E:
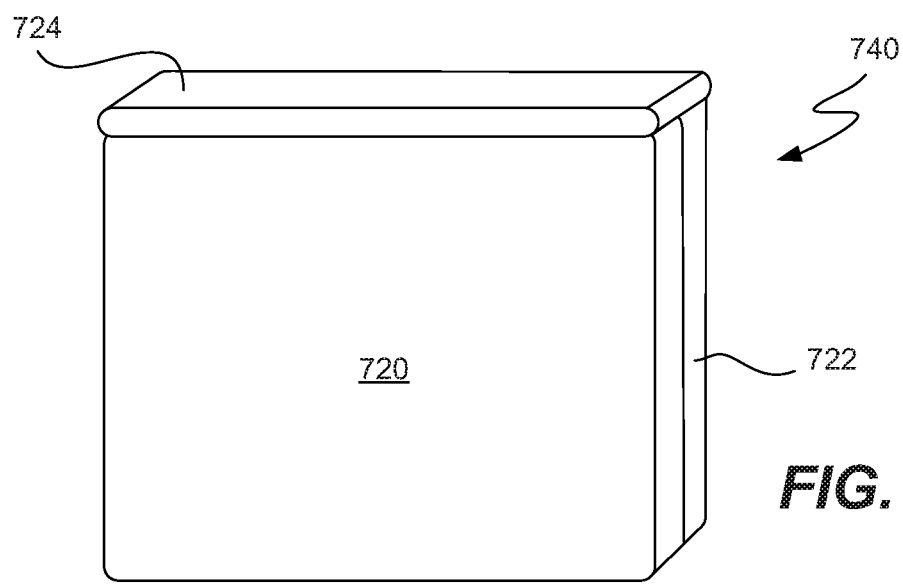

FIGS. 7C-7E illustrates front prospective views of an assembly of a display assembly 740 according to one embodiment. The display assembly 740 can represent the display assembly 700 illustrated in FIGS. 7A and 7B. The display assembly 740 is a dual display assembly that can display information on both front and back sides. Assembly can begin by obtaining two display panels 720 and 722, such as two matching LCD panels, as shown in FIG. 7C. Then, as shown in FIG. 7D, the two display panels 720 and 722 can be secured together back-to-back. An outer cover structure 724 can then placed on a top portion (or edge) of the display assembly 740. In the resulting embodiment, there are effectively three independent displays in the display assembly 740. The display panels 720 and 722 are two separate displays which can be secured back-to-back and can be controlled to provide mirrored display screens. The outer cover structure 724 is secured or abutted to the display panels 720 and 722. The outer cover structure 724 with its light segments therein can represent an edge display. Note that, although this embodiment does not depict an inner border region or coverage on edges at the sides, this embodiment can also include an inner border region as provided in other embodiments.

Figure 8A:
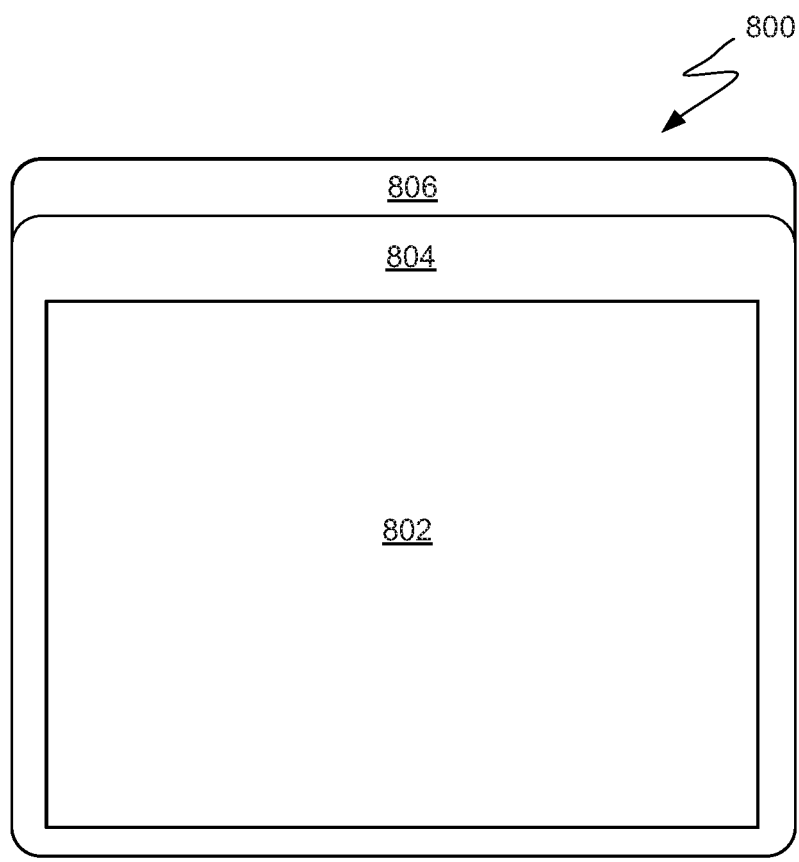
FIGS. 8A and 8B are front views of a display assembly according to one embodiment.
Figure 8B:
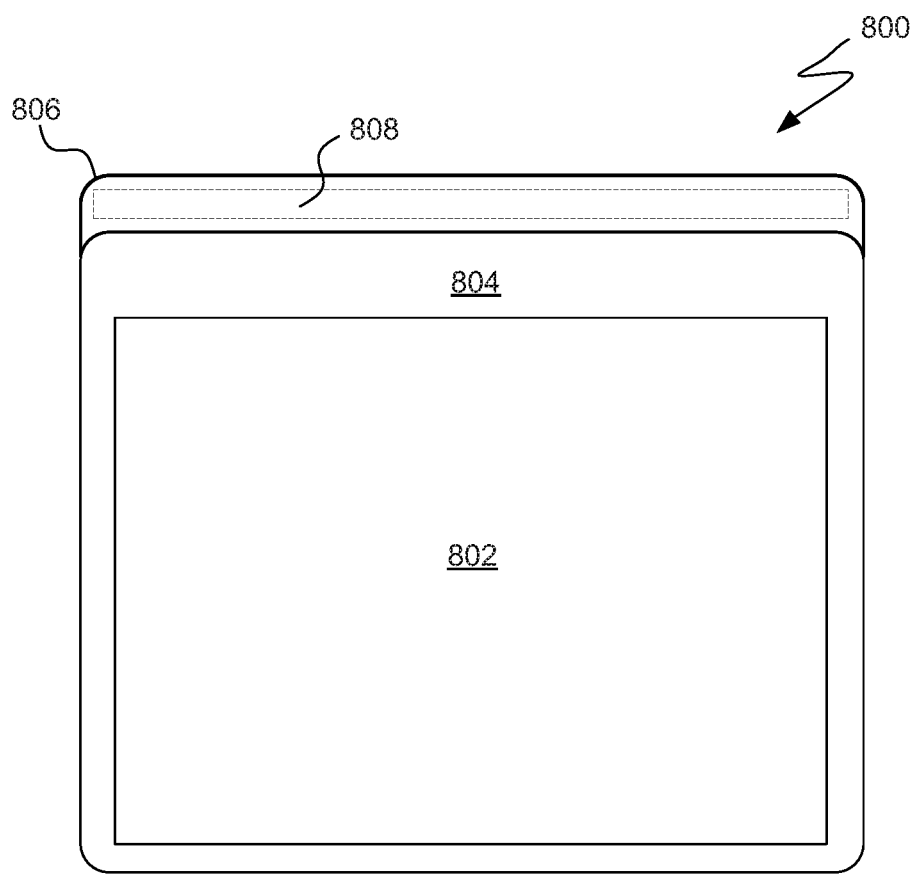

FIGS. 8A and 8B are front views of a display assembly 800 according to one embodiment. The display assembly 800 can represent a front view of the display assembly 700 shown in FIGS. 7A and 7B. The display assembly 800 includes a display panel 802 and an inner border region 804. The inner border region 804 can surround the outer periphery of the display panel 802. The display panel 802 can, in one implementation, pertain to a LCD panel. The display panel 802 can represent a computer display screen that can present text and/or or graphics. The display assembly 800 further includes an outer cover structure 806 that can be positioned around at least a portion of an outer periphery of the inner border region 804. The outer cover structure 806 can include a plurality of light segments. The light segments can be controlled to selectively illuminate. Typically, the outer cover structure 806 has a central hollow region that can contain the plurality of light segments. The outer cover structure 806 is configured to allow light to at least partially pass through a portion of the structure. That is, when one or more of the light segments are individually controlled to be illuminated, the resulting light is able to at least partially pass through the outer cover structure 806, either through such material (e.g., translucent plastic or glass) or by way of openings. As shown in FIG. 8A, the outer cover structure 806 is provided at a top portion (or edge) of the display assembly 800. It should be understood that in other embodiments, the outer cover structure 806 can be provided at the different portions of the display assembly 800, such as side portions and/or a bottom portion.

As shown in FIG. 8B, the outer cover structure 806 can include a plurality of light segments 808. The light segments 808 can be a series of individual light elements arranged adjacent one another in a linear fashion. In one implementation, the light elements can be Light Emitting Diodes (LEDs). In other embodiments, the light segment 808 can provide different colored light.

Although the outer cover structure 806 is secured, abutted or integral to the display panel 802, the display assembly 800 can represent multiple independent displays. For example the display panel 802 can represent a display screen, such as computer monitor type display, and the outer cover structure 806 with its light segments therein can represent an edge display. Also, given that FIGS. 8A and 8B represent front views, in one embodiment the backs view are the same, and in such case there can be another display panel at the back side of the display assembly 800. In such an embodiment, there are effectively three independent displays in the display assembly 800. Note also, that in such an embodiment, the outer cover structure 806 can provide an edge display that is visible from either the front side or the back side of the display assembly 800.

Figure 9:
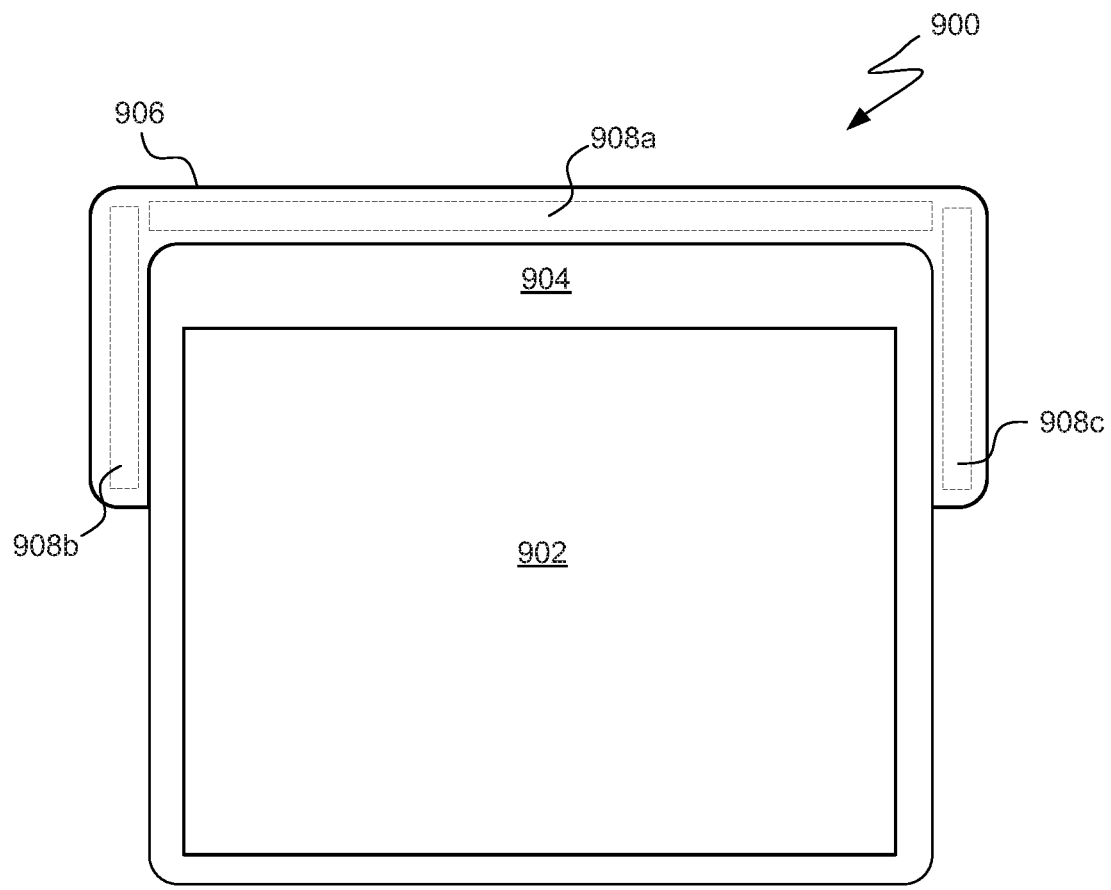
FIG. 9 is a front view of a display assembly according to one embodiment.

FIG. 9 is a front view of a display assembly 900 according to one embodiment. The display assembly 900 is generally similar to the display assembly 800 illustrated in FIGS. 8A and 8B except that additional light segments are provided. The display assembly 900 includes a display panel 902 and an inner border region 904. The inner border region 904 can surround the outer periphery of the display panel 902. The display panel 902 can, in one implementation, pertain to a LCD panel. The display panel 902 can represent a computer display screen that can present text and/or or graphics. The display assembly 900 further includes an outer cover structure 906 that can be positioned around at least a portion of an outer periphery of the inner border region 904. The outer cover structure 906 can include a plurality of light segments. The light segments can be controlled to selectively illuminate. Typically, the outer cover structure 906 has a central hollow region that can contain the plurality of light segments. The outer cover structure 906 is configured to allow light to at least partially pass through a portion of the structure. That is, when one or more of the light segments are individually controlled to be illuminated, the resulting light is able to at least partially pass through the outer cover structure 906, either through such material (e.g., translucent plastic or glass) or by way of openings. As shown in FIG. 9, the outer cover structure 906 is provided at a top portion (or edge) and also at upper portion of side portions (edges) of the display assembly 900. As shown in FIG. 9, the outer cover structure 906 can include a plurality of light segments 908. As depicted, the light segment 908 can include three light segments 908a, 908b and 908c. The light segment 908a can be provided within the top portion of the outer cover structure 906. The light segment 908b can be provided within the left side portion of the outer cover structure 906. The light segment 908c can be provided within the right side portion of the outer cover structure 906. These light segments 908a, 908b and 908c can be separately controlled or commonly controlled. These light segments 908a, 908b and 908c can also be implemented as distinct light sub-segments as shown in FIG. 9, or can alternatively be implemented as a single contiguous light segment. The light segments 908a, 908b and 908c can be a series of individual light elements arranged adjacent one another in a rigid or flexible manner. In one implementation, the light elements can be Light Emitting Diodes (LEDs). In one implementation, a flexible circuit can serve as a substrate for the LEDs attached thereto. The flexible circuit with LEDs can be configured as a strip of lights. In other embodiments, the light segments 908a, 908b and 908c can provide different colored light. In one embodiment, every light segment (e.g., LED) is individually addressable and can thus be individually controlled as to illumination, including on/off. Intensity, flashing, color, etc.

Although the outer cover structure 906 is secured, abutted or integral to the display panel 902, the display assembly 900 can represent multiple independent displays. For example the display panel 902 can represent a display screen, such as computer monitor type display, and the outer cover structure 906 with its light segments therein can represent an edge display. Also, given that FIG. 9 represents front views, in one embodiment the backs view are the same, and in such case there can be another display panel at the back side of the display assembly 900. In such an embodiment, there are effectively three independent displays in the display assembly 900. Note also, that in such an embodiment, the outer cover structure 906 can provide an edge display that is visible from either the front side or the back side of the display assembly 900.

Figure 10A:
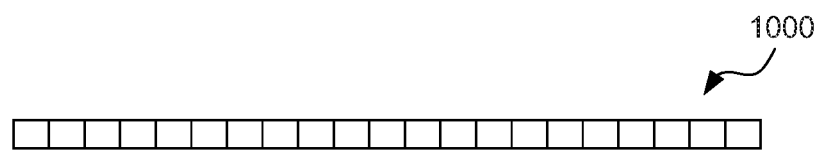
FIG. 10A illustrates a plurality of light segments for an edge display according to one embodiment.

FIG. 10A illustrates a plurality of light segments 1000 for an edge display according to one embodiment. The light segments 1000 can be individually controlled to be illuminated. In one embodiment, the illumination of the light segments 1000 can be controlled such that intensity of the generated light can be controlled. In the same or another embodiment, the illumination of the light segments 1000 can be controlled to produce colors. In various embodiments, the illumination of the lights 1000 can be controlled to provide patterns, animations, or effects (e.g., blinking).

Figure 10B:
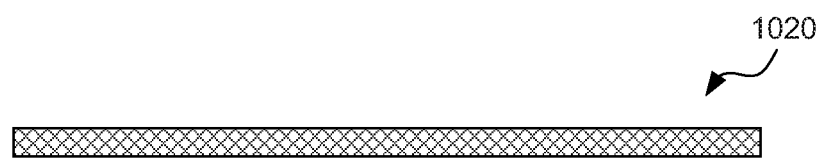
FIG. 10B illustrates a plurality of light segments for an edge display according to one embodiment.

FIG. 10B illustrates a plurality of light segments 1020 for an edge display according to one embodiment. The light segments 1020 can represent an implementation of the light segments 1000 of the edge display illustrated in FIG. 10A. The light segments 1020 are controlled to depict a status message (or notification). For example, as shown in FIG. 10B, the light segments are all denoted as illuminated, which can represent a message. The message can convey that dealer break status. For example, if the light segments are all illuminated green, the message can be that dealer is not on break and no break is imminent; if the light segments are all illuminated yellow (and optionally flashing), the message can be that a dealer break is imminent; and if the light segments are all illuminated red (and optionally flashing), the message can be that the dealer is presently on break.

Figure 10C:
FIG. 10C illustrates a plurality of light segments for an edge display according to another embodiment.

FIG. 10C illustrates a plurality of light segments 1040 for an edge display according to another embodiment. The light segments 1040 can represent an implementation of the light segments 1000 of the edge display illustrated in FIG. 10A. The light segments 1040 are controlled to depict a status message (or notification). For example, as shown in FIG. 10C, the light segments are respective end regions are denoted as illuminated, which can represent a message. The message can convey dealer break status. For example, if the light segments at the ends are illuminated green, the message can be that dealer is not on break and no break is imminent; if the light segments at the ends are illuminated yellow (and optionally flashing), the message can be that a dealer break is imminent; and if the light segments at the ends are illuminated red (and optionally flashing), the message can be that the dealer is presently on break.

Figure 11A:
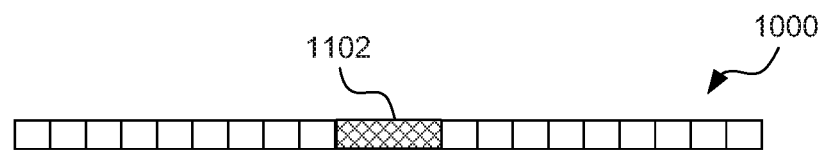
FIG. 11A illustrates a plurality of light segments for an edge display according to one embodiment.

FIG. 11A illustrates a plurality of light segments 1100 for an edge display according to one embodiment. The light segments 1100 can represent an implementation of the light segments 1000 of the edge display illustrated in FIG. 10A. The light segments 1100 are depicted as illuminating a pattern 1102 which can represent a winning streak of one by a dealer or player. The color of the pattern 1102 can be used to determine whether the winning streak is for the dealer or the player.

Figure 11B:
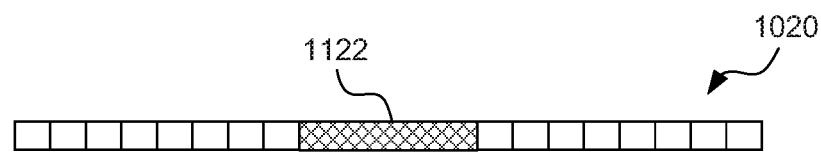
FIG. 11B illustrates a plurality of light segments for an edge display according to one embodiment.

FIG. 11B illustrates a plurality of light segments 1120 for an edge display according to one embodiment. The light segments 1120 can represent an implementation of the light segments 1000 of the edge display illustrated in FIG. 10A. The light segments 1120 are depicted as illuminating a pattern 1122 which can represent a winning streak of two by a dealer or player. The color of the pattern 1122 can be used to determine whether the winning streak is for the dealer or the player. Note that the length of the pattern 1122 is longer than the length of the pattern 1102, thereby visually depicting that the winning streak is two not one.

Figure 11C:
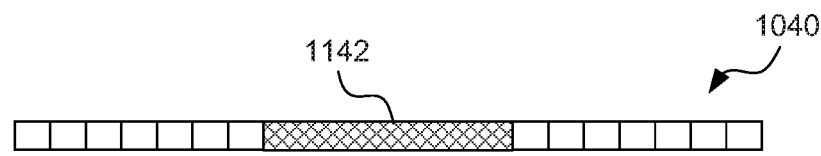
FIG. 11C illustrates a plurality of light segments for an edge display according to one embodiment.

FIG. 11C illustrates a plurality of light segments 1140 for an edge display according to one embodiment. The light segments 1140 can represent an implementation of the light segments 1000 of the edge display illustrated in FIG. 10A. The light segments 1140 are depicted as illuminating a pattern 1142 which can represent a winning streak of three by a dealer or player. The color of the pattern 1142 can be used to determine whether the winning streak is for the dealer or the player. Note that the length of the pattern 1142 is longer than the length of the pattern 1122, thereby visually depicting that the winning streak is three not one or two.

Figure 11D:
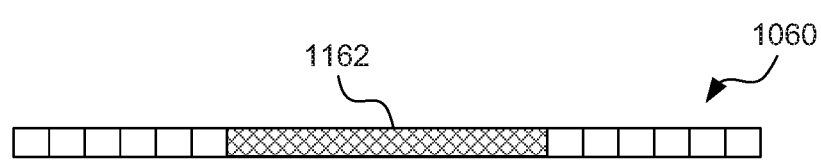
FIG. 11D illustrates a plurality of light segments for an edge display according to one embodiment.

FIG. 11D illustrates a plurality of light segments 1160 for an edge display according to one embodiment. The light segments 1160 can represent an implementation of the light segments 1000 of the edge display illustrated in FIG. 10A. The light segments 1160 are depicted as illuminating a pattern 1162 which can represent a winning streak of four by a dealer or player. The color of the pattern 1162 can be used to determine whether the winning streak is for the dealer or the player. Note that the length of the pattern 1162 is longer than the length of the pattern 1142, thereby visually depicting that the winning streak is four not one, two or three.

Figure 11E:
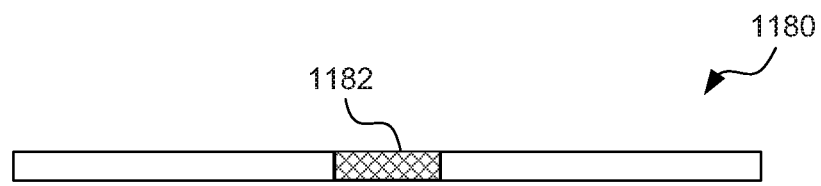
FIG. 11E-11G illustrate a plurality of light segments for an edge display according to one embodiment.
Figure 11F:
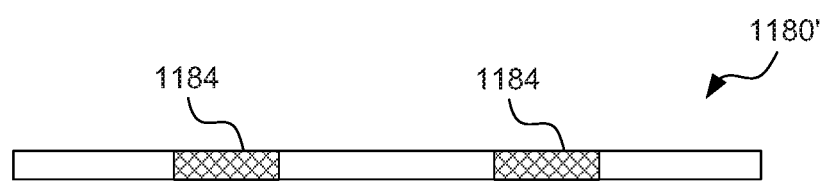
Figure 11G:

FIG. 11E-11G illustrate a plurality of light segments 1180 for an edge display according to one embodiment. The light segments 1180 can represent implementations of the light segments 1000 of the edge display illustrated in FIG. 10A. The light segments 1180 in FIG. 11E are depicted as illuminating a first pattern 1182. The light segments 1180' in FIG. 11F are depicted as illuminating a second pattern 1184. The second pattern 1184 has two different lighted portions separated by a first length. The light segments 1180" in FIG. 11G are depicted as illuminating a third pattern 1186. The third pattern 1186 has two different lighted portions separated by a second length that is greater than the first length. The patterns 1182, 1184 and 1186 of the light segments 1180, 1180' and 1180" are, in one embodiment, sequentially displayed. In one embodiment, the patterns 1182, 1184 and 1186 of the light segments 1180, 1180' and 1180" when repeatedly sequentially displayed can denote a dragon tail which is a long winning streak of one by a dealer or player. The color of the pattern 1182, 1184 and 1186 of the light segments 1180, 1180' and 1180" can be used to determine whether the long winning streak is for the dealer or the player. For example, the color of the pattern 1182, 1184 and 1186 of the light segments 1180, 1180' and 1180" can be blue for denoting player winning streaks; the color of the pattern 1182, 1184 and 1186 of the light segments 1180, 1180' and 1180" can be red for denoting banker winning streaks; and the color of the pattern 1182, 1184 and 1186 of the light segments 1180, 1180' and 1180" can be a dim white for denoting no wins.

Additionally, different gaming apparatus or gaming systems (e.g., for different wager-based games) can provide different messaging using one or more edge displays. That is, for different wager-based games, an edge display can be controlled to yield different messaging. The various light segments can be controlled to visually indicate game state, such as who won the current game and whether there is a winning streak.

Table 1 provided below shows exemplary programmable control for lights segments used with an edge display for a gaming table provide game play of a table-based wagering game, such as Baccarat.

TABLE 1

| Outcome | Color | Game Streak Length | | | |
|---|---|---|---|---|---|
| | | 1 Game | 2 Games | 3 Games | 4 Games |
| Dealer Win | Red | 3 Segments (Adjacent) | 5 Segments (Adjacent) | 7 Segments (Adjacent) | 9 Segments (Adjacent) |
| Player Win | Blue | 3 Segments (Adjacent) | 5 Segments (Adjacent) | 7 Segments (Adjacent) | 9 Segments (Adjacent) |
| Tie | Green | 3 Segments (Adjacent) | 5 Segments (Adjacent) | 7 Segments (Adjacent) | 9 Segments (Adjacent) |
| Dragon Tail | Red & Blue | Flash & Animate Numerous Segments | Flash & Animate Numerous Segments | Flash & Animate Numerous Segments | Flash & Animate Numerous Segments |

Here, for example, the illumination denoted in Table 1 can be for a top, horizontal series of light segments of an edge display, which can be thus controlled to indicate game state.

Additionally or alternatively, an edge display can be controlled to provide status or event messaging.

In one embodiment, one or more corners of an edge display can be illuminated to indicate a status or event. For example, to signal a dealer's status, one or more corners of an edge display can be: (i) illuminated green to indicate dealer is at work at an associated gaming apparatus; (ii) illuminated amber (and optionally flashing or blinking) to indicate that a break for the dealer is impending (e.g., within 5 minutes); and (iii) illuminated red (and optionally flashing or blinking) to indicate that the dealer is presently on a break.

In another embodiment, a manager (e.g., pit boss) for a gaming apparatus can cause a dealer break, apart from any normal schedule for breaks. This type of break can be denoted on an edge display in a normal fashion, or can be illuminated differently to represent that it is a special break.

In another embodiment, a player (e.g., a player banker) for a gaming apparatus providing a wager-based game using a player banker can cause a break. This type of break can be denoted on an edge display the same way as a dealer break, or can be illuminated differently to represent that it is a special break. For example, one or more corners of an edge display can be illuminated orange (and optionally flashing or blinking) to indicate that the player banker is on a requested break.

In another embodiment, in case of a jackpot or bonus win, an edge display can be illuminated in a predetermined fashion to signal such. In an area where there are various gaming apparatus and corresponding edge displays, additional or all of the edge displays for other gaming apparatus can also illuminate to celebrate the jackpot or bonus win at another gaming apparatus.

In other embodiments, a display screen (e.g., LCD display(s)) associated with an edge display can also be illuminated in a predetermined manner. In one implementation, the displayed content on the display screen is synchronized with the illumination of the edge display. As one example, an animated graphic of a flying dragon can be displayed on the display screen, while the edge display flashes numerous light segments (e.g., red and blue as in Table 1). As another example, an animated graphic of a flying dragon can be displayed on the display screen, while the edge display illuminates certain light segments to represent a tail (which may be moving) for the flying dragon being displayed on the display screen.

An electronic gaming system, gaming management system or fulfillment system can be implemented or embodied in various ways. Examples of several embodiments are illustrated below in FIGS. 12-16. Features of various different embodiments discussed herein can be combined as desired.

Figure 12A:
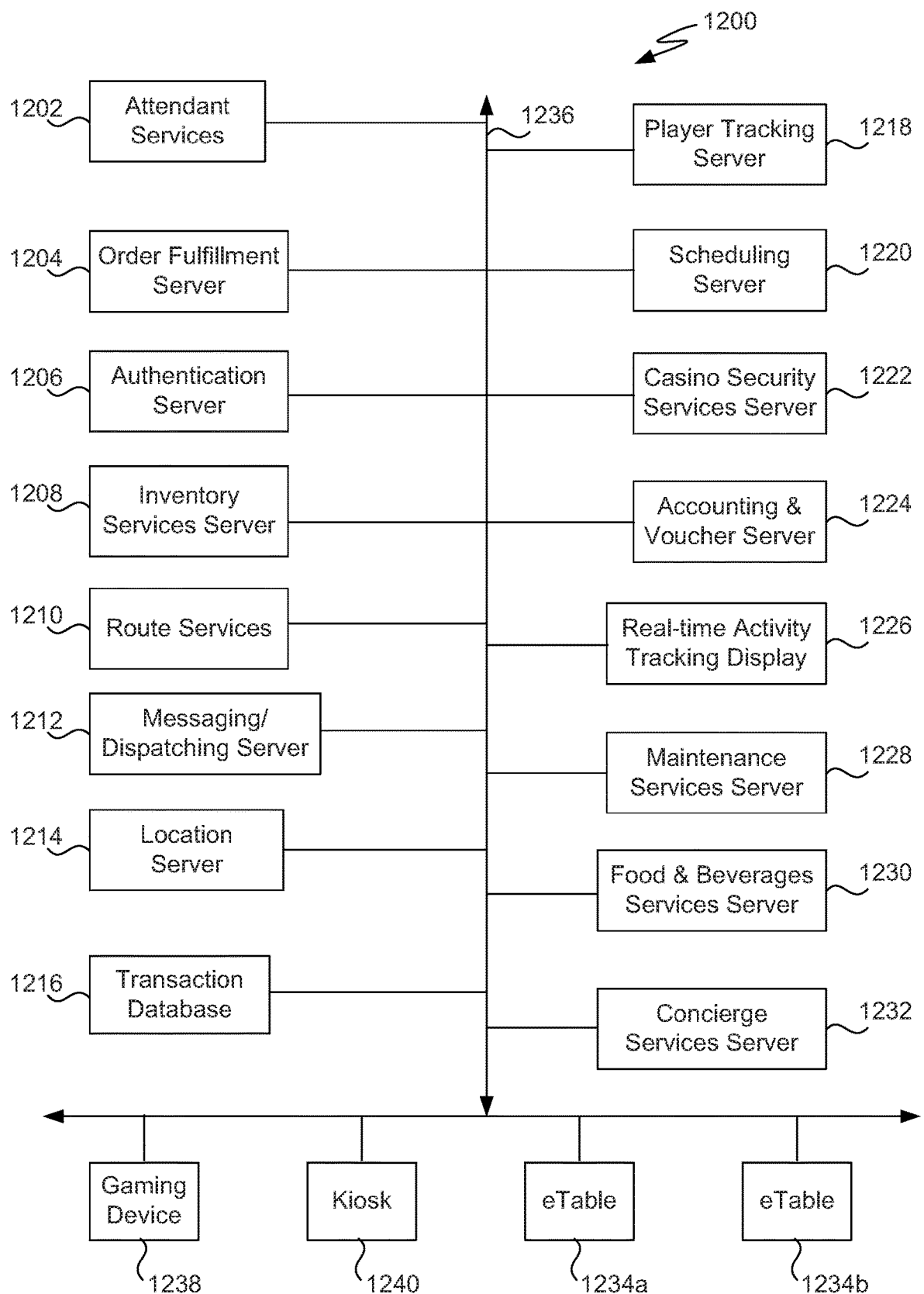
FIG. 12A illustrates a block diagram of an exemplary gaming management system according to one embodiment.

FIG. 12A illustrates a block diagram of an exemplary gaming management system 1200 according to one embodiment. The gaming management system 1200 serves to authenticate, authorize, monitor, and schedule dealers; lock/un-lock gaming apparatus of a gaming establishment; and/or initiate, monitor, manage, and complete fulfillment of supplies, services, and requests within a gaming environment. The gaming management system 1200 includes a network 1236. The network 1236 may be in communication with various servers and resources discussed below. Additionally, network 1236 may be a global network, a local area network, and/or any combination of wired and/or wireless networks.

The gaming management system 1200 may include an order fulfillment server 1204 in communication with network 1236. The order fulfillment server 1204 may be similar to a logistic management server discussed herein. Order fulfillment server 1204 may provide the backend processing for the gaming management system 1200. Order fulfillment server 1204 may support a plurality of gaming apparatuses such as gaming device 1238, kiosk 1240, eTables 1234a-1234b, and the like. The gaming apparatuses 1238, 1240, 1234a and 1234b can pertain to a game of chance, such as a wager-based game or a skill-based game, or some combination thereof. Examples of gaming apparatus include gaming tables, slot machines, portable gaming devices, and the like.

When services are required, a request may be transmitted to order fulfillment server 1204 by a casino employee and/or a customer. For example, a black jack table may need additional chips. The request for additional chips at a table game may be transmitted to order fulfillment server 1204 via a gaming support appliance 212a-c, as discussed with reference to FIG. 2. The request may be automatically transmitted by the gaming support appliance or requested by the dealer or pit boss.

In one embodiment, the request may be authenticated by authentication server 1206. In this example, a dealer requesting chips may be required to provide authentication information to ensure that the chips are being requested by a dealer at a black jack table and not a thief trying to steal the chips. In another embodiment, the request may be automatically generated by gaming support appliance, such as gaming support appliance 212a-c in FIG. 2. Thus, authentication of the gaming support appliance may be performed by authentication server 1206. Authentication may be completed by any known means such as fingerprint reader, employee card reader, eye scanner, facial and/or voice recognition devices, password log-in information, and the like.

In one embodiment, the request may be authenticated by authentication server 1206. In this example, a dealer requesting chips may be required to provide authentication information to ensure that the chips are being requested by a dealer at a black jack table and not a thief trying to steal the chips. In another embodiment, the request may be automatically generated by gaming support appliance, such as gaming support appliance 110 in FIG. 1. Thus, authentication of the gaming support appliance may be performed by authentication sever 1206. Authentication may be completed by any known means such as fingerprint reader, employee card reader, eye scanner, facial and/or voice recognition devices, password log-in information, and the like.

Once authentication of the dealer and/or gaming support appliance is completed, the request can cause a voucher request for the chips to be transmitted to accounting and voucher server 1224. Accounting and voucher server 1224 may generate a voucher for the chips. The vouchers may be physical (e.g., paper) or digital vouchers.

The order fulfillment server 1204 may transmit the request to inventory services server 1208 to notify a proper gaming environment department of the request. In this example, the inventory services server 1208 may notify a gaming establishment cashier of the request for additional chips. Inventory services sever 1208 may store an inventory of chips and/or other necessary gaming paraphernalia (i.e., cards, money, and the like) that is housed in each location within the gaming environment. Therefore, obtaining the necessary items will be efficient and loss of the items (e.g., supplies) may be tracked. For example, an attendant would be directed to go to a cashier cage that has enough chips to fulfill the request.

Additionally, the order fulfillment server 1204 may determine the location of the black jack table from location server 1214. Location server 1214 may store a map of a gaming environment as well as location information for each of its gaming apparatuses 1238, 1240, 1234a and 1234b. Once the location of the black jack table is determined, an efficient and timely route to deliver the chips may be determined from route services 1210. This allows for timely service for the table to receive the chips, efficient use of an attendant's (i.e., gaming environment employee's) time, and ensure that no chips or monies are lost along the way. Route services 1210 may also store a map of the gaming environment and/or utilize the map of the gaming environment from location server 1214. Route services may then plan or map out an efficient route for the attendant to obtain and deliver the requested chips, which may cover the events such as pick up of a voucher, deliver the voucher to the cashier's cage in exchange for chips, and provide them to the appropriate table.

Messaging/dispatching services server 1212 may be similar to notification system 122 discussed with reference to FIG. 1. Messaging/dispatching services server 1212 may determine and schedule an attendant that is available to perform the services. This ensures that the gaming employees or attendants are not idle and will always have a task to complete. In this regard, messaging/dispatching services server 1212 may work with scheduling server 1220 to determine which attendant is working, which location the attendant is working at, and whether the attendant is on a break. In one example, scheduling server 1220 may determine that Attendant A is working from 9 am-12 pm with a break between 10 am-10:15 am. Scheduling server 1220 may also determine that Attendant A is working as a dealer at table 2 at 9 am and then at table 5 at 10:15 am.

Referring back to the example above, messaging/dispatching services server 1212 may be aware that the selected attendant is needed to be able to pick-up a voucher and present it to the nearest location housing the chips. The request for additional chips, along with an efficient route, may be presented on a computing device associated with the attendant, such as a portable computing device or smart phone, via attendant services server 1202. Attendant services server 1202 may manage which computing device is associated with which attendant as well as which attendant is able to complete which service.

In one embodiment, the location of the attendant may be tracked by location server 1214 and/or real-time activity tracking display 1226. Real-time activity tracking display 1226 may be in communication with gaming device 1238, kiosk 1240, and/or eTable 1234a-1234b to provide and present a visual display of the location of the attendant and also the chips being delivered by attendant. In other words, the dealer may see, via real-time activity tracking display 1226, when the attendant leaves the table, arrives at the cashier cage, leaves the cashier cages, and the route that is used to deliver the chips to the table.

Assuming an embodiment using vouchers, the attendant may pick-up the voucher at the table, such as a Black Jack table. In one embodiment, prior to receiving the voucher, the attendant may need to be authenticated by authentication server 1206. For example, the attendant may need to input authentication information into a computing device, such as a dealer management server or a gaming support appliance.

This is to ensure that the voucher is being picked-up by a legitimate gaming environment employee and not a thief.

The attendant may thereafter present the voucher at a cashier's cage or any other location where the chips may be obtained. The voucher may be exchanged for the chips, which may be delivered to the black jack table following the efficient and timely route planned out by route services 1210. Once at the black jack table, the dealer and attendant may, in one embodiment, both again be authenticated by authentication server 1206 to ensure the chips are delivered to the proper location and/or persons.

Upon delivery and completion of the request, attendant, dealer, and/or both persons may submit a completion notification to transaction database 1216. Transaction database 1216 may be coupled to the order fulfillment server 1204 via fulfillment network 1236. The transaction database 1216 can provide storage for transaction data (e.g., records) associated with fulfillment of services, requests, or re-supplies to various gaming apparatus. The transaction data can provide a transaction log. The transaction data can be stored at the transaction database 1216 and can be utilized for ensuring that all transactions are carefully monitored and recorded for future review, audit, and the like.

In another example, a customer may want to order a beer while playing a wagering game of chance at a gaming device 1238 or eTable 1234a-1234b. The request for the beer, in one embodiment, may be entered by the customer into the gaming device 1238, kiosk 1240, or eTable 1234a-n. The request may be transmitted to order fulfillment server 1204. In yet another example, a customer may notice a spill on the gaming establishment floor and report the spill at a gaming device 1238 or kiosk 1240. The report may then be transmitted to order fulfillment server 1204 to request someone to clean it up.

When order fulfillment server 1204 receives a request, the request may then be transmitted to the appropriate server. For example, a request for a drink may be transmitted to the food and beverages service server 1230. The food and beverage service server 1230 may manage who and how the drink will be delivered to the customer. Upon receipt of the request, the food and beverage service server 1230 may determine the location of the customer from location server 1214. Location server 1214 may store a map of the gaming environment as well as location information for each of its gaming apparatuses 1238, 1240, 1234a-1034b. Once the location of the customer is determined, food and beverages services 1230 may communicate with route services 1210 to determine the most efficient and fastest route for an attendant to take to deliver the drink. This allows for timely service to the customer and efficient use of an attendant's (i.e., gaming environment employee's) time. Route services 1210 may also store a map of the gaming environment and/or utilize the map of the gaming environment from location server 1214. Route services may then plan or map out an efficient route for the attendant to use to reach the customer requesting the drink.

Once the most efficient and timely route is determined, the request, including the efficient and timely route, may be transmitted to messaging/dispatching services server 1212. In one embodiment, messaging/dispatching services server 1212 may be similar to notification system 122 discussed with reference to FIG. 1.

Messaging/dispatching services server 1212 may determine and schedule an attendant that is available to prepare and deliver the drink to the customer. The request, along with the efficient and timely route, may be presented on a computing device associated with the attendant, such as a portable computing device, via attendant services server 1202. Attendant services server 1202 may manage which computing device is associated with which attendant as well as which attendant is able to complete which service. The attendant, upon receiving the request, may then prepare the drink and deliver it following the efficient and timely route.

In one embodiment, the location of the attendant may be tracked by location server 1214 and/or real-time activity tracking display 1226. Real-time activity tracking display 1226 may be in communication with gaming device 1238, kiosk 1240, and/or eTable 1234a-1034b to provide and present a visual display of the location of the drink. In other words, the customer at gaming device 1238 may see, via real-time activity tracking display 1226, when the drink exits the food and beverage location and the location of the attendant in route towards the customer.

Upon delivery of the drink and completion of the request, attendant may submit a completion notification to transaction database 1216. Transaction database 1216 may be coupled to the order fulfillment server 1204 via fulfillment network 1236. The transaction database 1216 can provide storage for transaction data (e.g., records) associated with fulfillment of services, requests, or re-supplies to various gaming apparatus. The transaction data can provide a transaction log. The transaction data can be stored at the transaction database 1216 and can be utilized for ensuring that all transactions are carefully monitored and recorded for future review, audit, and the like.

As stated above, those of ordinary skill in the art will understand and know that services and/or requests may vary from food and beverage services, gaming services, entertainment services, customer services, security services, inventory services, maintenance services, and the like. Order fulfillment server 1204 may manage each service request received. A request to help find a missing child may be transmitted to casino security services 1222. A request to clean up a spill may be transmitted to maintenance services server 1228. Request for concert tickets may be transmitted to concierge services server 1232. A request for a player tracking card replacement may be transmitted to player tracking services 1218.

Whatever the request, it may be transmitted to the proper server to fulfill the request by order fulfillment server 1204. When transmitted to the proper server, location server 1214 and route services server 1210 may be used to determine the most efficient, quickest, and fastest route for an attendant to use to fulfill the request. Authentication server 1206 may also be used to authenticate the attendant, gaming personnel (i.e., dealer, pit managers, cashier cage managers, and the like) to ensure nothing is stolen. Messaging/dispatch server 1212 may manage and determine which gaming personnel is best able to fulfill the request. This ensures that the gaming employees or attendants are not idle and will always have a task to complete. Attendant services 1202 may manage the devices associated with each attendant to ensure that the notifications are transmitted to the proper attendant that is able to complete the tasks and requests. Finally, each transaction, (e.g., route taken by the attendant, time of completion, and the like) may be stored in transaction database 1216.

Besides order fulfillment, the gaming management system 1200 can also operate to control access to the gaming device 1238, kiosk 1240, and/or eTable 1234a-1034b by users, such as dealers, or access to gaming supplies used by such devices. The gaming management system 1200 can include a dealer management server 1242. In one embodiment, the dealer management server 1242 can correspond to the dealer management server 102 illustrated in FIG. 1. The dealer management server 1242 couples to network 1036 and can access other components of the gaming management system 1200 in operating to authenticate, authorize, monitor, alert and/or schedule dealers. For example, the dealer management server 1242 can be assisted with (i) authentication by the authentication server 1206, (ii) communication by the messaging/dispatching server 1212, (iii) scheduling by the scheduling server 1220. In general, the dealer management server 1242 can, for example, perform any of the function discussed above concerning the dealer management server 102, 300.

Additionally, the gaming device 1238, kiosk 1240, and/or eTable 1234a-1034b can include or couple to a lock mechanism that can be controlled by the dealer management server 1242, or other server, to initiate lock or un-lock of the respective gaming device 1238, kiosk 1240, and/or eTable 1234a-1034b. For example, such devices can be locked by inhibiting access to gaming supplies utilized by such devices.

Figure 12B:
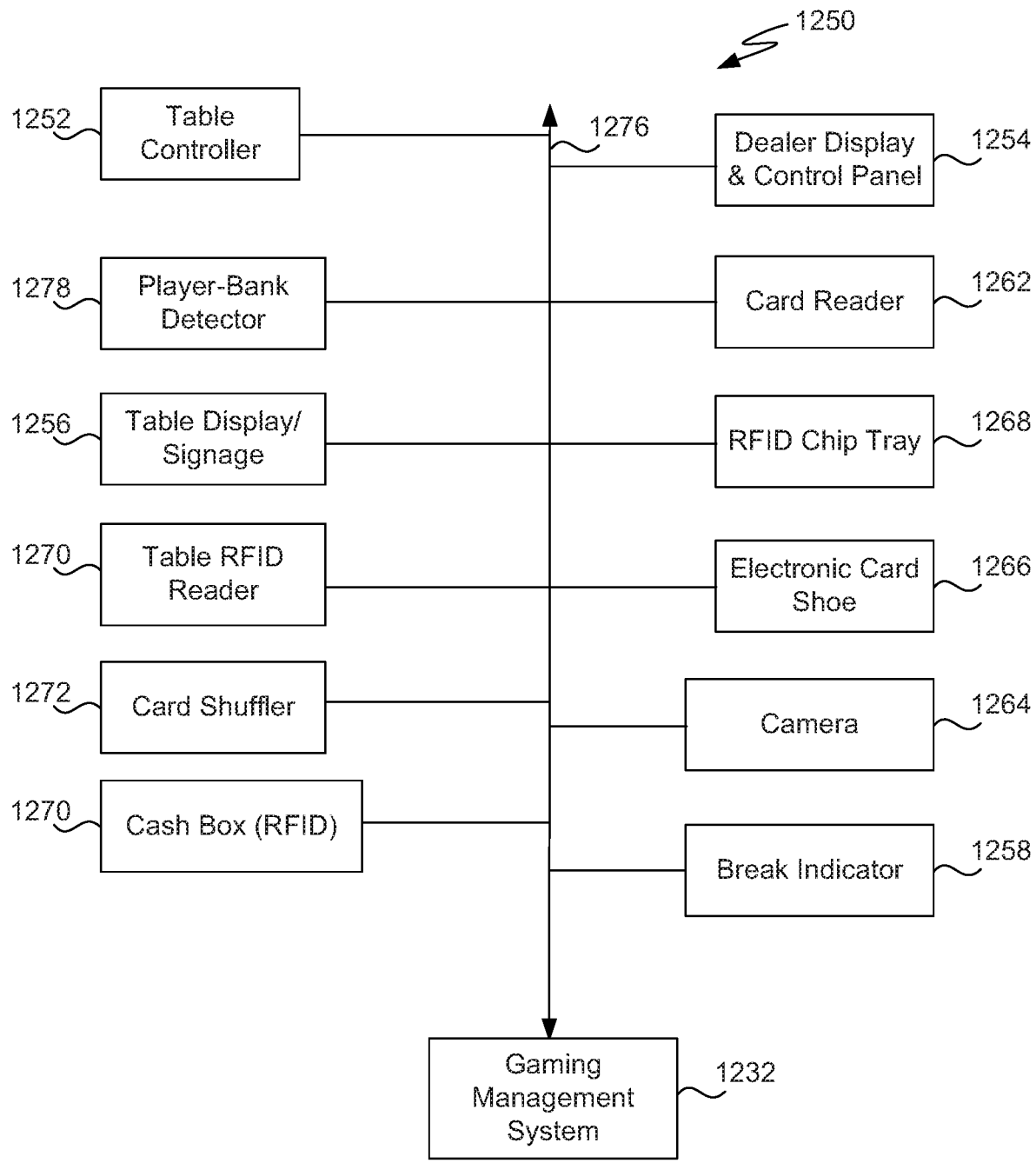
FIG. 12B is a gaming apparatus according to one embodiment.

FIG. 12B is a gaming apparatus 1250 according to one embodiment. The gaming apparatus 1250 includes various components that operate to facilitate playing of a wager-based game by one or more players. Often, the wager-based game is a card game and the gaming apparatus 1250 provides a table for providing a playing surface. The gaming apparatus 1250 can also include various electronic components to support playing and/or managing play of wager-based games at the gaming apparatus 1250.

The gaming apparatus 1250 can include a table controller 1252. The table controller 1252 can control overall operation of the gaming apparatus 1250. For example, the table controller 1252 can monitor games, cards, chips, dealers and/or players as well as receive and send data to a remote gaming management system 1274 via a network. 1276. The gaming apparatus includes various electronic components that can couple to the table controller 1252 via the network 1276. The network 1276 can be wired and/or wireless, and can include one or more networks. Typically, the gaming management system 1274 is associated with an establishment where the gaming apparatus 1250 is present. The table controller 1252 can also participate in controlling access (by dealers or others) to the gaming apparatus 1250 and or its associated gaming supplies. In other words, the table controller 1252 can lock and unlock the gaming apparatus. In one embodiment, the gaming apparatus 1250 can provide the various operational states illustrated in the dealer authorization and monitoring system 200 shown in FIG. 2.

The gaming apparatus 1250 can include a dealer display and control panel 1254. The dealer display and control panel 1254 can, for example, correspond to the dealer terminal 114 discussed above regarding FIG. 1. The dealer display and control panel 1254 can provide a control panel that a dealer can interact with to operate the gaming apparatus 1250. In one implementation, the dealer display and control panel 1254 can be a touch screen control panel. The dealer display and control panel 1254 can enable the dealer to login or authenticate, deal, request or exchange gaming supplies, order other services for the dealer or patrons (e.g. beverage requests), and the like.

The gaming apparatus 1250 can also include a table display/signage 1256. The table display/signage 1256 can be implemented as a community display that can display information to interest to persons, such as players, and/or managers of dealers (e.g., pit bosses). As an example, the dealer shift change (or lockout) timer, betting timer or other information that may be of interest could be display on the table display/signage 1256.

The gaming apparatus 1250 can also include a break indicator 1258. For example, the break indicator 1258 can represent a visual indicator, such as a light (e.g., LED light), provided at the gaming apparatus 1250. The break indicator 1258 can clearly indicate whether or not the dealer at the gaming apparatus 1250 is on a break. The break indicator 1258 can be provided at the gaming apparatus 1250 at one or more different positions. As one example, the break indicator 1258 can be provided on an electronic card shoe. As another example, the break indicator 1258 can be integral with the dealer display and control panel 1254. As still another example, the break indicator 1258 can be a stand-alone visual indicator, such as an LED light bar, that is controlled by the table controller 1252.

The gaming apparatus 1250 can also include an electronic card shoe 1266 and a RFID chip tray 1268. The electronic card shoe 1266 can contain and release cards that are used in playing a wager-based card game at the gaming apparatus 1250. In one embodiment, the electronic card shoe 1266 can provide a locking function that can prevent cards from being removed (i.e., dealt), such as to control when the cards can be removed from the electronic card shoe 1266. For example, the electronic card shoe 1266 can be placed in a locked condition in which unauthorized users are unable to make use of cards from the electronic card shoe 1266. In one embodiment, the electronic card shoe 1266 can include a card reader 1262. The card reader 1262 is able to optically read the cards being removed (i.e., dealt) from the electronic card shoe 1266. The data captured by the card reader 1262 can be provided to the table controller 1252 for monitoring of the distribution of cards from the electronic card shoe 1266 in conjunction with playing of the wager-based card games at the gaming apparatus 1250. The RFID chip tray 1268 is one implementation of an electronic chip tray that can electronically monitor quantities of chips, markers, money, tokens, and the like within the electronic chip tray. The RFID chip tray 1268 can also be coupled to the table controller 1252. In one embodiment, the RFID chip tray 1268 can be covered and/or locked to inhibit access to the items within the electronic chip tray, such as during lock-down of the gaming apparatus 1250.

The gaming apparatus 1250 can further include the table RFID reader 1270. The table RFID reader 1270 can be provided at the gaming apparatus 1250, which can include a gaming table. The table RFID reader 1270 can utilize short range radio signals to monitor game play and/or gaming supplies at the gaming apparatus 1250. The table RFID reader 1270 can include or interact with the RFID chip tray 1268.

The gaming apparatus 1250 can include a cash box 1270 that can receive and store cash. In one embodiment, the cash box 1270 can be a RFID cash box. The cash box 1270 can include a lockout function to prevent utilization of the cash box 1270 by unauthorized users or unauthorized times. The cash box 1270 can be controlled by the table controller 1270.

The gaming apparatus 1250 can also include at least one camera 1264. The camera 1264 can be utilized record game status as well as to monitor gaming supplies, such as chips and cards, with respect to the gaming apparatus 1250. The camera can also be utilized to receive or archive player decisions, monitor card shuffling, monitor game play, etc.

The gaming apparatus 1250 can further include a card shuffler 1272. The card shuffler 1272 can operate to automatically shuffle cards for use at the gaming apparatus 1250.

For example, in one implementation, the gaming apparatus 1250 includes a gaming table in which a wager-based card game is played. The card shuffler 1272 can shuffle the cards in an automated fashion. The card shuffler 1272 can also be coupled to or integrated with the electronic card shoe 1266.

Further still, in one embodiment, the table controller 1252 can also provide player-banker monitoring. In this regard, the gaming apparatus can include a player-bank detector 1278. The player-bank detector 1278 can operate to detect which player is acting as a player-bank for a wager-based game that uses a player-banker. The player-banker detector 1278 can utilize various different mechanisms. As one example, a RFID button/token can be utilized to denote a player-banker's position. As another example, a manual dealer input can be utilized to denote a player-banker's position, such as using the dealer display and control panel 1254. The player-banker detector 1278 can also implement a timing monitor that can determine how long a particular player serves as the player-banker.

Additionally, the gaming apparatus 1250 can also include one or more input components. In input component can be made available to a dealer or player. For example, a dealer can utilize an input component to login for authentication purposes. The input component can be coupled to the gaming apparatus 1250 in general, or can be coupled to a particular component thereof, such as the electronic card shoe 1266. The dealer can utilize the input component to login. For example, the input component can use a PIN entry, biometric reader, a magnetic card/fob reader, RFID token reader, and the like.

Figure 13:
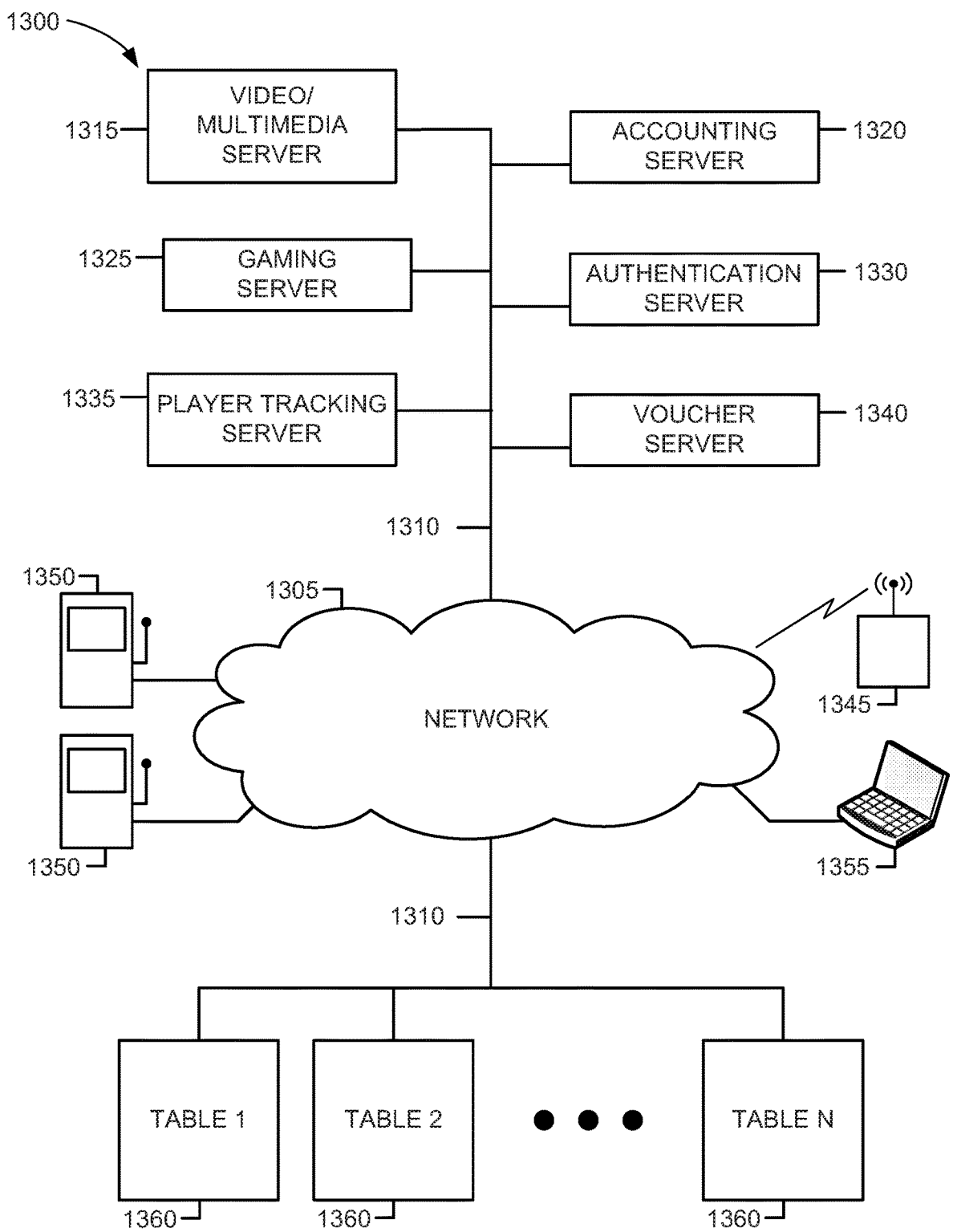
FIG. 13 illustrates an electronic gaming system according to one embodiment.

FIG. 13 illustrates an electronic gaming system 1300 according to one embodiment. The electronic gaming system 1300 may include electronic gaming tables 1360, which may be coupled to a network 1305 via a network link 1310. The electronic gaming tables 1360 may be gaming tables with enhanced electronic capabilities. The network 1305 may be or include one or more of a public and a private network. One or more video streams may be received at a video/multimedia server 1315 from the gaming tables 1360. The video/Multimedia server 1315 may transmit one or more of these video streams to a mobile device 1345, a gaming device 1350, a laptop 1355, and/or any other remote electronic device. The video/Multimedia server 1315 may transmit these video streams via network link 1310 and network 1305.

The electronic gaming system 1300 may include an accounting/transaction server 1320, a gaming server 1325, an authentication server 1330, a player tracking server 1335, and a voucher server 1340.

The accounting/transaction server 1320 may compile, track, store, and/or monitor cash flows, voucher transactions, winning vouchers, losing vouchers, and/or other transaction data for the casino operator and for the players. Transaction data may include the number of wagers, the size of these wagers, the date and time for these wagers, the identity of the players making these wagers, and the frequency of the wagers. The accounting/transaction server 1320 may generate tax information relating to these wagers. The accounting/transaction server 1320 may generate profit/loss reports for predetermined gaming options, contingent gaming options, predetermined betting structures, and/or outcome categories.

The gaming server 1325 may generate gaming options based on predetermined betting structures and/or outcome categories. These gaming options may be predetermined gaming options, contingent gaming options, and/or any other gaming option disclosed herewith.

The authentication server 1330 may determine the validity of vouchers, players' identity, and/or an outcome for a gaming event.

The player tracking server 1335 may track a player's betting activity, a player's preferences (e.g., language, drinks, font, sound level, etc.). Based on data obtained by the player tracking server 1335, a player may be eligible for gaming rewards (e.g., free play), promotions, and/or other awards (e.g., complimentary food, drinks, lodging, concerts, etc.).

The voucher server 1340 may generate a voucher, which may include credit data or data relating to gaming options. For example, a voucher can be provided that represent a credit value and can be redeemed for game play or cash out. As another example, data relating to the structure (e.g., 6 out of the next 10 rolls at craps table 4 will be a 7 or 11) may be generated. If there is a time deadline, that information may be generated by the voucher server 1340. Vouchers may be physical (e.g., paper) or digital.

Figure 14:
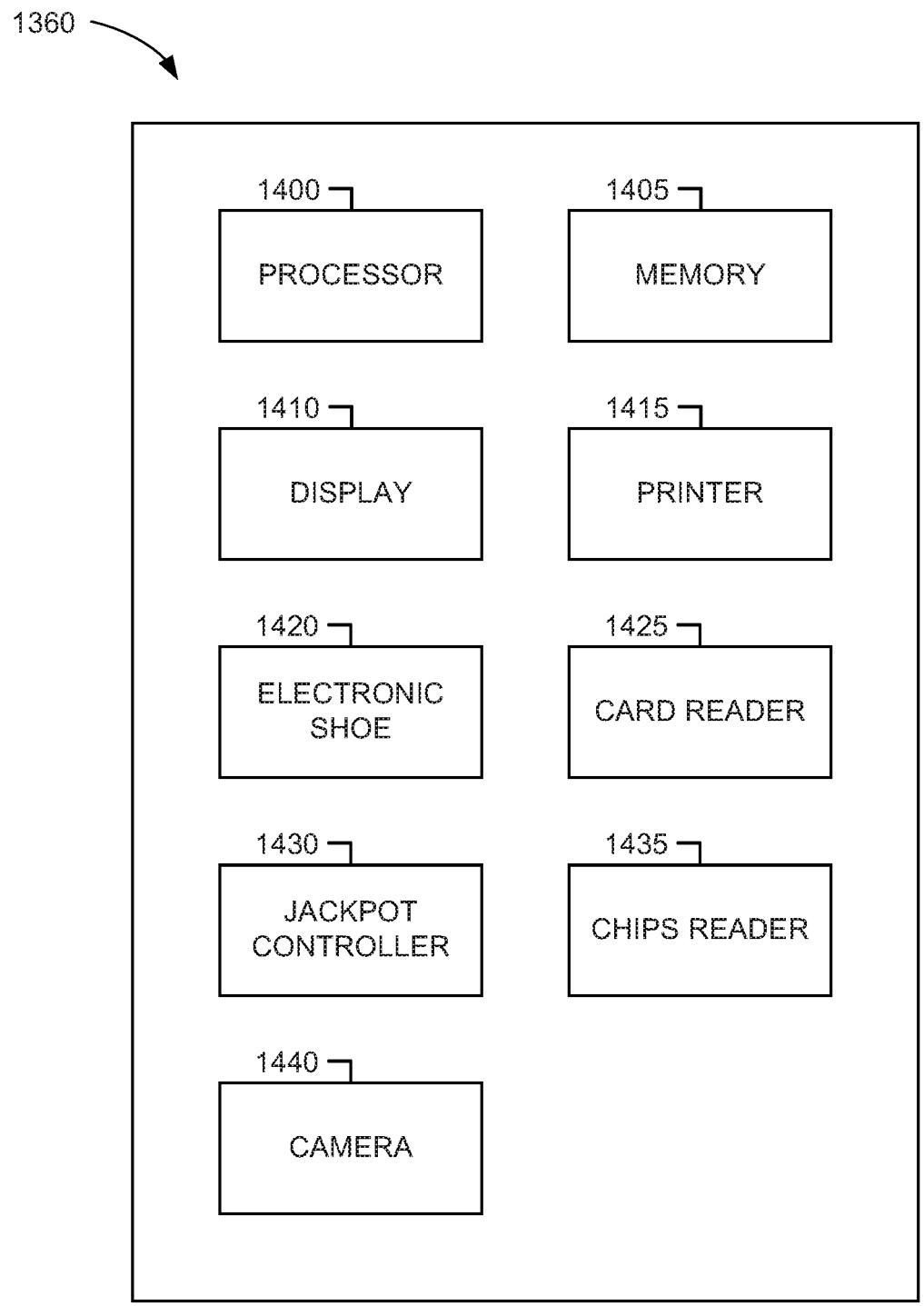
FIG. 14 shows electronic gaming table with various features, according to one embodiment.

FIG. 14 shows electronic gaming table 1360 with various features, according to one embodiment. The electronic gaming table 1360 may include a processor 1400, a memory 1405, a display 1410, a printer 1415, an electronic shoe 1420, a card reader 1425, a jackpot controller 1430, a chips reader 1435, and a camera 1440.

The processor 1400 may be communicatively coupled to any other device in the electronic gaming table 1360. The processor 1400 via an interface may communicate, wired or wireless, with any of the elements of the electronic gaming system 1100.

The memory 1405 may include data relating to gaming events, video streams transmitted from the electronic gaming table 1360, winning and losing percentages for gaming options relating to the electronic gaming table 1360, and game management data (e.g., dealer schedule, chip refills, etc.).

The display 1410 may show previous game results, a betting structure, outstanding bets, transaction volume, present value of betting options, a table minimum bet, a table maximum bet, or any other video data.

The printer 1415 may generate vouchers, promotional items, food tickets, event tickets, chip/cash vouchers, card vouchers and/or lodging tickets. Vouchers may be physical (e.g., paper) or digital.

The electronic shoe 1420 may obtain data and/or images of gaming objects utilized with gaming table 1360. This data and/or images may be transmitted to electronic gaming devices and displayed as images from table games. For example, on a blackjack table a ten of spades may be dealt to a player. This information is obtained via the electronic shoe 1420 and utilized to generate an image and/or illustration of a ten of spades card by electronic gaming system 1100, which maybe shown as images from table games displayed at gaming tables 1360 and/or mobile device 1145, a gaming device 1150, a laptop 1155. In another example, electronic shoe 1420 may receive data relating to the numbers on dice, transmit this data to electronic gaming system, which may be utilized to generate an image/illustration of the dice by electronic gaming system (e.g., images from table games displayed at gaming tables 1360 and/or mobile device 1145, a gaming device 1150, a laptop 1155.).

The card reader 1425 may provide identification, authentication, and application processing functions. The card reader 1425 may interface with smart cards, magnetic striped card, bar code reader, RFID card, and the like.

The jackpot controller 1430 may track and compile data associated with a jackpot. The jackpot controller 1430 may award the jackpot on a specific occurrence (e.g., dealing a royal flush) and/or randomly award a jackpot.

The chips reader 1435 may compile and track data associated with the amount of chips one or more players possesses, the amount of chips won/lost at the gaming table 1360, the amount of chips in the dealer's rack at the gaming table 1360, an amount of chips bet by one or more players, amount of chips in the betting pool, and/or any combination thereof.

The camera 1440 may obtain data from the gaming table 1360. The camera 1440 may be one or more cameras located to view the gaming objects (e.g., cards, dice, dominos, ball, wheel, etc.), the dealer, the shoe, the players' hands, the players, and/or any combination thereof. The camera 1440 may transmit this data to the gaming table 100, which may be utilized to generate an image/illustration of the gaming objects.

As discussed herein, a fulfillment system, such as the dealer management system 100, may be applied in a live table system that monitors a live table game in which physical or virtual cards are dealt to one or more players at a gaming table, or other physical game components are employed such as dice, and collects the randomly generated game play data. The game play data collected is used to enable play of the same live table game remotely through gaming terminals. The gaming terminals may be any platform capable of receiving and transmitting data, including "thin-client" platforms or platforms which do not process game play data and "smart" platforms or platforms which process game play data. The gaming terminal maybe stationary, similar to the slot machines or electronic tables commonly seen at the physical casino, or maybe portable electronic devices such as smart phones, computer tablets, portable media players, laptop computers, desktop computers, smart TV, and the like. Additionally, the gaming network they attach to can be of wired (Ethernet, Token Ring, Serial multidrop, etc.) or wireless variety (802.11x, BlueTooth, LTE, 2G/3G/4G cellular, Zigbee, Ultra Wide Band, etc.) known in the art. It should be appreciated that players interested in placing wagers on a live-table game not be confined to the gaming table or even the casino floor.

Figure 15:
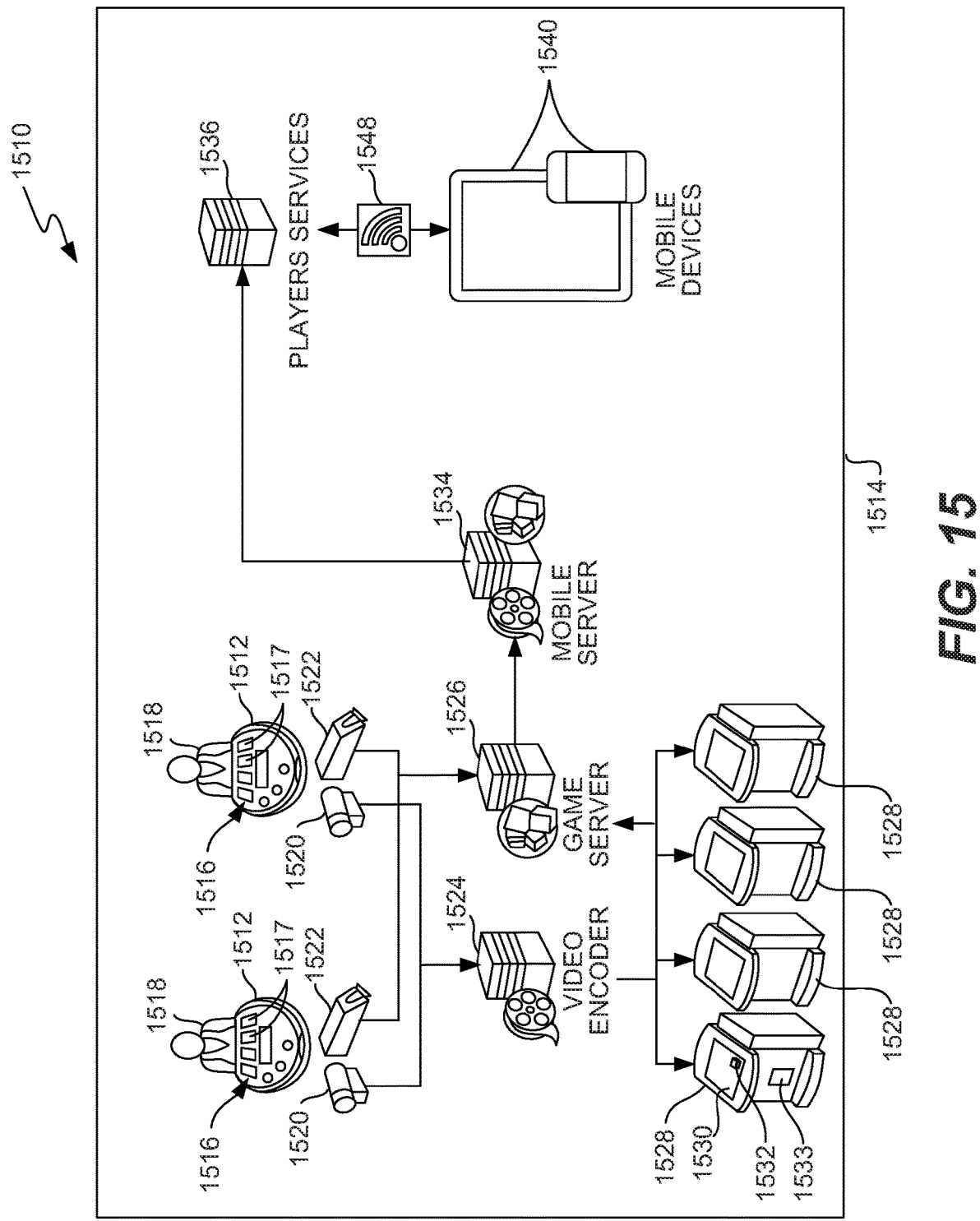
FIGS. 15 and 16 illustrate one embodiment of a system for providing multiple synchronous games for multiple plays from a live table game.
Figure 16:
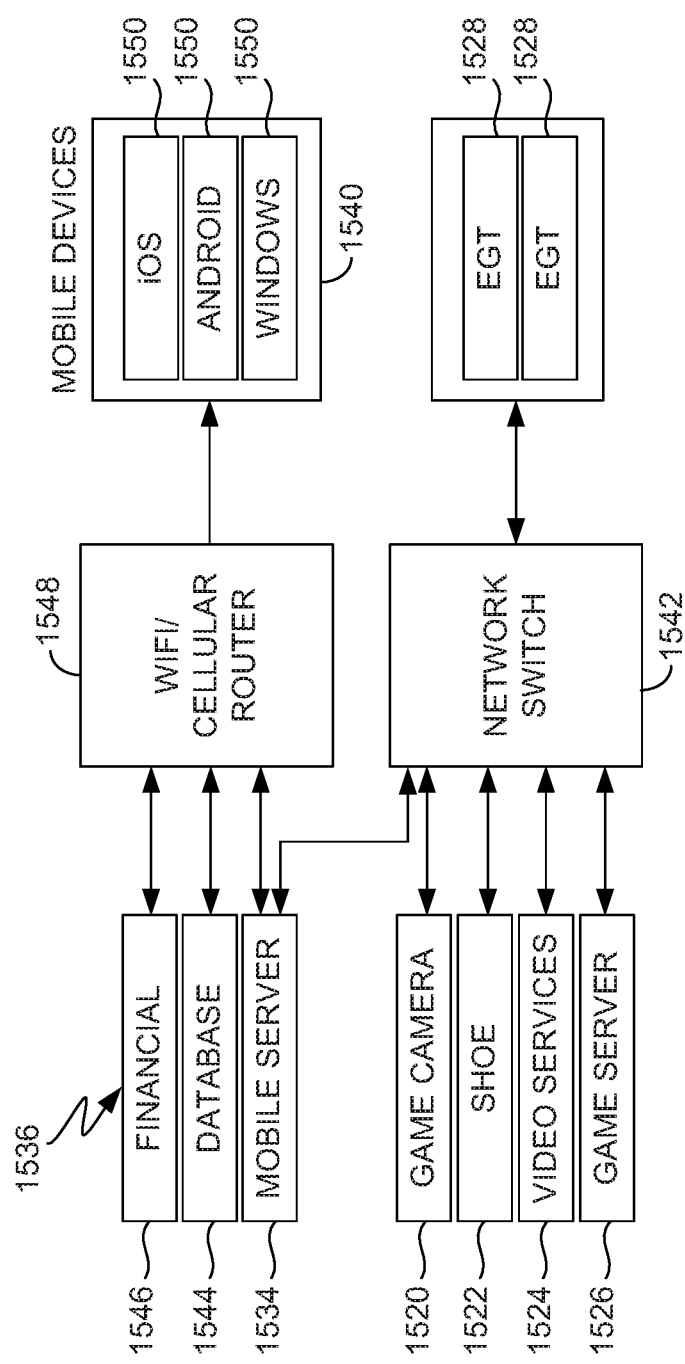

FIGS. 15 and 16 illustrate one embodiment of a system 1510 for providing multiple synchronous games for multiple plays from a live table game. In the illustrated embodiment, the system 1510 includes at least one physical game table 1512 located in a live play area or gaming space such as a casino 1514. The system 1510 also includes a physical game system, generally indicated at 1516, for playing a live table game in connection with the physical game table 1512 to generate a single live game data sequence by a live dealer 1518 operating the physical game system 1516. In one embodiment, the system 1510 may include one or more physical game tables 1512, one or more physical game systems 1516, and one or more live dealers 1518. The physical game system 1516 includes as least one of the following: (i) an electronic card shoe, a shoe controller, a plurality of physical cards, a dealer display, and a network interface for a card game; (ii) a wheel, a controller, a ball, a ball drop sensor, a dealer display, and a network interface for a roulette game; (iii) a set of dice, a controller, a dealer display, and a network interface for a dice game; and/or (iv) a plurality of spinning reels, a controller, a dealer display, and a network interface for a slot game. In the embodiment illustrated, the physical game system 1516 includes a plurality of physical cards 1517 for a card game such as Baccarat and an electronic card shoe 1522. It should be appreciated that the physical cards 1517 are shuffled and loaded into the electronic card shoe 1522 for dealing to play the card game. It should also be appreciated that one live dealer 1518 may operate one or more live table games on the physical game table 1512 in connection with one or more physical game systems 1516, each physical game system 1516 generating a single live game data sequence. For example, a physical game table 1512 may have two physical game systems 1516, such as, an electronic shoe system 1522 for a card game, and an electronic roulette wheel system (not shown) for a roulette game. Both the card game and the roulette game systems may be operated by the same live dealer 1518, such as in an alternating manner. It should further be appreciated that the live game data sequence is, for one example, the order in which the physical cards 1517 are dealt or, for another example, the spinning of the roulette wheel, dropping the ball on the wheel, and the ball finally resting on one spot of the wheel. Specific components of the system 1510 may be referenced using functional terminology in their names. The function terminology is used solely for purposes of naming convention and to distinguish one element from another in the following discussion. Unless otherwise specified, the name of an element conveys no specific functionality to the element or component. It should be appreciated that, in selected embodiments, the software, hardware, and associated components of the system 1510 may be programmed and configured to implement one or more embodiments described herein. It should also be appreciated that the various aspects of the system 1510 may be exemplified as software, modules, nodes, etc. of a computer or server.

Referring to FIGS. 15 and 16, the system 1510 also includes at least one camera 1520 for recording video of the single live game data sequence generated by the physical game system 1516. In the embodiment illustrated, there are two cameras 1520 with one camera 1520 for each live dealer 1518. The camera 1520 may be positioned in a variety of locations to capture all the gaming activity occurring at the physical game table 1512, the dealer 1518 playing the physical game system 1516 in connection with the game table 1512, or just the hands of the dealer 1518 playing the physical game system 1516 in connection with the game table 1512. For example, the camera 1520 may be situated above the game table 1512, pointed toward the dealer 1518, or placed inside or under a rim of the game table 1512 and directed toward the center of the table 1512 (to capture a dealt card that is viewed by the dealer 1518). In another embodiment, multiple cameras 1520 may be used, each focusing on one aspect of the physical table game 1512. For example, one camera 1520 may be positioned to capture the live dealer 1518, another camera 1520 may be pointed at the card shoe 1522, and yet another camera 1520 may be zoomed in to the dealt cards on the physical game table 1512. Each camera 1520 records a live video feed of game-play at the game table 1512, which is transmitted over a network shown in FIG. 16. The live feed may include a digital or analog signal representing gaming action captured by the camera 1520. It should be appreciated that the camera 1520 provides a live broadcast of the game actions at the physical table game 1512 to the one or more game terminals 1528. It should also be appreciated that this video stream is normally for informational purposes only (e.g., the players can verify that the dealer operate the game correctly). It should still further be appreciated that a more detailed description of a live dealer game is disclosed in U.S. Pat. No. 8,348,763 to Moshal et al., the entire disclosure of which is hereby expressly incorporated by reference.

The system 1510 includes at least one of a video encoder and/or a video transcoder 1524 in communication with the at least one camera 1520. In the embodiment illustrated, there are two video encoders/transcoders 1524 in communication with the two cameras 1520, one video encoder/transcoder 1524 being associated with one camera 1520 for each live dealer 1518. It should be appreciated that the video encoder/transcoder 1524 encodes the digital video from the camera 1520 to meet proper formats and specifications for recording and broadcasting through the use of video broadcasting systems.

The system 1510 also includes a game server 1526 in communication with at least one physical game system 1516 to receive the single live game data sequence and generate multiple synchronous games from the single live game data sequence. In one embodiment, the game server 1526 includes a processor 1527*a* and a memory 1527*b* for storing rules, logic, and payout tables of the multiple synchronous games and applies the rules, logic, and payout tables to the single live game data sequence to generate the multiple synchronous games. The game server 1526 may also include a database 1544 for storing information or be coupled to a database 1544 to access information. The game server 1526 is in communication with the one or more physical game systems 1516. In the illustrated embodiment, the game server 1526 is coupled to each electronic card shoe 1522 via a communications link such as a network switch that enables communication over a network, such as, for example, the Internet, a cellular telecommunications network, a wireless network and/or any suitable communication network. It should be appreciated that the gamer server 1526 is configured to carry out the methodologies described herein. It should also be appreciated that the game server 1526 may be programmed in a suitable language to carry out the methodologies. The game server 1526 may be arranged in a variety of configurations and may include a communication interface that receives and transmits game play data which is randomly generated as a result of playing the live table game, a processor that facilitates comparing the live game data with the rules and/or criteria for winning the wagers stored in data storage and determines an outcome of the wagers placed on the live table game via a data communication device of the electronic gaming terminal 1528. The game server 1526 is configured to receive the one or more wagers on the multiple synchronous games from the one or more electronic game terminals 1528, to provide the multiple synchronous games to the one or more electronic gaming terminals 1528 synchronously, to determine the results or outcomes of the multiple synchronous games, to resolve the one or more wagers on the multiple synchronous games synchronously from the one or more electronic game terminals 1528, and to payout rewards on the multiple synchronous games to the one or more electronic game terminals 1528. It should be appreciated that the game server 1526 may perform functions described below by executing computer-readable program instructions stored in data storage to enable a plurality of electronic gaming devices to each play a separate instance of one or more live dealer games, to determine the outcome of game-play decisions and game results at a live dealer game, to transmit the game results to one or more electronic gaming terminals 1528 to be described, to operate in conjunction with a larger online gaming system (e.g., a separate gaming server, an online casino website, or a web server), or to manage a remote player's credit account, for example. It should be appreciated that the electronic gaming terminal 1528 may be of the type disclosed in U.S. Patent Pub. US20160012663 A1, published Jan. 14, 2016 and U.S. application Ser. No. 14/864,334, filed Sep. 24, 2015, the entire disclosure of which is hereby incorporated by reference.

The system 1510 further includes one or more electronic gaming terminals 1528 in communication with the game server 1526. Each of the electronic gaming terminals 1528 has a display 1530 to display the multiple synchronous games from the game server 1526 and an input mechanism 1532 to input one or more wagers on the multiple synchronous games. In the illustrated embodiment, each electronic gaming terminal 1528 includes a controller 1533 that is coupled to the display 1530 and the input mechanism 1532 and a communications device (not shown). The controller 1533 receives and transmits information to and from the game server 1526 and displays the games and the graphical interfaces on the display 1530 to enable a player or user to interact with the game server 1526 to play the games in accordance with the embodiments described herein. The display 1530 includes, without limitation, a flat panel display, such as a cathode ray tube display (CRT), a liquid crystal display (LCD), a light-emitting diode display (LED), active-matrix organic light-emitting diode (AMOLED), a plasma display, and/or any suitable visual output device capable of displaying graphical data and/or text to a user. Moreover, the input mechanism 1532 includes, without limitation, buttons, a keyboard, a keypad, a touch-sensitive screen, a scroll wheel, a pointing device, a barcode reader, a magnetic card reader, a radio frequency identification (RFID) card reader, an audio input device employing speech-recognition software, gestures, and/or any suitable device that enables a user to input data into the controller 1533 and/or to retrieve data from the controller 1533. It should be appreciated that a single component, such as a touch screen, a capacitive touch screen, and/or a touchless screen, may function as both the display 1530 and as the input mechanism 1532. It should also be appreciated that the display 1530 is configured to facilitate the entry of wagers, show a live multimedia feed of the table game being played and communicate the outcome of any wagers placed.

The system 1510 may include a mobile server 1534 in communication with the game server 1526 via the network switch 1542 to output the multiple synchronous games to one or more mobile devices 1540 to be described. The mobile server 1534 may be arranged in a variety of configurations and may include a processor and a communication interface that receives and transmits game play data from the game server 1526.

The system 1510 may include a player tracking server 1536 in communication with the mobile server and the one or more mobile devices to allow remote play of the multiple synchronous games and to track the remote play of the multiple synchronous games. The player tracking server 1536 provides games, accounting, and financial services for mobile players. The player tracking server 1536 may include memory for storage of a database 1544 for tracking games and player data and a financial database 1546 for storing financial data and for processing financial transactions related to the player wagering such as money transfers, deposits, withdrawals, balance monitoring, etc.

The system 1510 also may include a wireless or cellular router 1548 in communication with the mobile server 1534, player tracking server 1536, and one or more mobile devices 1540 that enables communication over a network, such as, for example, the Internet, a cellular telecommunications network, a wireless network and/or any suitable telecommunication network.

The system 1510 may further include one or more mobile devices 1540 in communication with the wireless router 1548. Each of the mobile devices 1540 has a display to display the multiple synchronous games from the game server 1526 and an input mechanism to input one or more wagers on the multiple synchronous games. The mobile device 1540 includes a processor operating system 1550 such as iOS, Android, or Windows. The processor operating system 1550 communicates with the mobile server 1534 and the player tracking server 1536 via the wireless router 1548 and the cellular telecommunications network and/or the Internet. In one embodiment, the mobile device 1540 may include a portable computer, laptop, cell phone, tablet computer, smart phone/tablet computer hybrid, personal/home video game device, personal data assistant, and/or any suitable computing device that enables a player to connect to the mobile server 1534 and the player tracking server 1536 and display the graphical interfaces.

Further, U.S. Design application Ser. No. 29/600,225, filed Apr. 10, 2017, and entitled "DISPLAY," which is incorporated herein for all purposes, provides information on an embodiment of an edge display.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. In one embodiment, the computer readable medium is non-transitory. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. An electronic gaming system, comprising:
   an electronic gaming table having a table controller, a dealer terminal and a gaming appliance;
   a table display device configured to operatively connect to the table controller and be controlled to present gaming related information pertaining to wager-based table games at the electronic gaming table; and
   an edge display configured to operatively connect to the table controller and be controlled to present gaming related messages,
   wherein one or more the gaming related messages are messages pertaining to dealer status for a dealer operating wager-based table games at the electronic gaming table.

2. An electronic gaming system as recited in claim 1, wherein the edge display comprises:
   a plurality of light segments positioned about at least a portion of a periphery of the table display device,
   wherein illumination of the plurality of light segments is based on an outcome from a wager-based table game played at the electronic gaming table.

3. An electronic gaming system as recited in claim 1, wherein the edge display comprises:
   a plurality of light segments positioned about at least a portion of a periphery of the table display device,
   wherein illumination of the plurality of light segments provides display a light-based message.

4. An electronic gaming system as recited in claim 1, wherein the edge display comprises:
   a plurality of light segments positioned about at least a one side of the table display device,
   wherein the light segments are arranged in a row.

5. An electronic gaming system as recited in claim 4, wherein each of the light segments are individually controlled.

6. An electronic gaming system as recited in claim 1, wherein one or more the gaming related messages are messages pertaining to wager-based table games at the electronic gaming table.

7. An electronic gaming system as recited in claim 1, wherein the dealer status indicates a break status for the dealer.

8. An electronic gaming system as recited in claim 1, wherein the edge display is affixed adjacent to the table display device.

9. An electronic gaming system as recited in claim 1, wherein the table display device displays the gaming related information at an intensity that is substantially less than an intensity with which the edge display displays the gaming related messages.

10. An electronic gaming system as recited in claim 1, wherein the table display device is capable of displaying at a first maximum intensity, and wherein the edge display is capable of displaying at a second maximum intensity, the second maximum intensity being greater that the first maximum intensity.

11. An electronic gaming system as recited in claim 1, wherein the edge display comprises:

a plurality of light segments positioned about at least a portion of a periphery of the table display device, the light segments arranged adjacent one another, wherein the plurality of light segments are configured to communicate with the table controller to be individually controlled to be illuminated.

12. An electronic gaming system as recited in claim 11, wherein the illumination of the plurality of light segments are controlled to display different light-based messages using different colored light.

* * * * *